US012684526B2

(12) United States Patent
Hirzallah et al.

(10) Patent No.: US 12,684,526 B2
(45) Date of Patent: Jul. 14, 2026

(54) POSITIONING MEASUREMENT DATA FILTERING

(71) Applicant: QUALCOMM Incorporated, San Diego, CA (US)

(72) Inventors: Mohammed Ali Mohammed Hirzallah, San Diego, CA (US); Taesang Yoo, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 18/461,970

(22) Filed: Sep. 6, 2023

(65) Prior Publication Data

US 2025/0081154 A1     Mar. 6, 2025

(51) Int. Cl.
*H04W 64/00*              (2009.01)

(52) U.S. Cl.
CPC ....... *H04W 64/003* (2013.01); *H04W 64/006* (2013.01)

(58) Field of Classification Search
CPC ... H04W 64/00; H04W 4/029; H04W 64/006; H04W 4/023; H04W 64/003; H04W 4/33; H04W 4/025; H04W 4/02; H04W 28/0226; H04W 4/027; H04W 4/38; H04W 12/104; H04W 12/63; H04W 36/32; H04W 4/026; H04W 4/024; H04W 52/0245; H04W 8/08
See application file for complete search history.

(56) References Cited

U.S. PATENT DOCUMENTS

| | | | | |
|---|---|---|---|---|
| 2013/0005356 A1* | 1/2013 | Kobayashi | .......... | H04W 64/003 |
| | | | | 455/456.1 |
| 2022/0369070 A1* | 11/2022 | Feki | ......................... | G06N 5/01 |
| 2023/0037704 A1 | 2/2023 | Hirzallah et al. | | |
| 2023/0354254 A1* | 11/2023 | Sundararajan | ........ | G01S 5/0244 |
| 2024/0057022 A1* | 2/2024 | Ashraf | .................. | H04W 64/00 |
| 2024/0089905 A1* | 3/2024 | Gopalakrishnan | ....... | G06N 3/08 |

FOREIGN PATENT DOCUMENTS

| | | |
|---|---|---|
| WO | 2023066662 A1 | 4/2023 |
| WO | 2023148665 A1 | 8/2023 |

OTHER PUBLICATIONS

International Search Report and Written Opinion—PCT/US2024/044272—ISA/EPO—Nov. 20, 2024—13 pages.

* cited by examiner

*Primary Examiner* — Kwasi Karikari
(74) *Attorney, Agent, or Firm* — Procopio, Cory, Hargreaves & Savitch LLP

(57) ABSTRACT

A user equipment (UE) may receive a configuration for collecting measurements to at least one of train or verify a positioning model. The UE may receive a set of positioning signals. The UE may measure the set of positioning signals. The UE may output a subset of the measured set of positioning signals to at least one of train or verify the positioning model based on the configuration. The UE may output the subset of the measured set of positioning signals by training verifying the positioning model at the UE based on the subset of the measured set of positioning signals, or by transmitting the subset of the measured set of positioning signals to at least one of train or verify the positioning model.

27 Claims, 15 Drawing Sheets

$\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

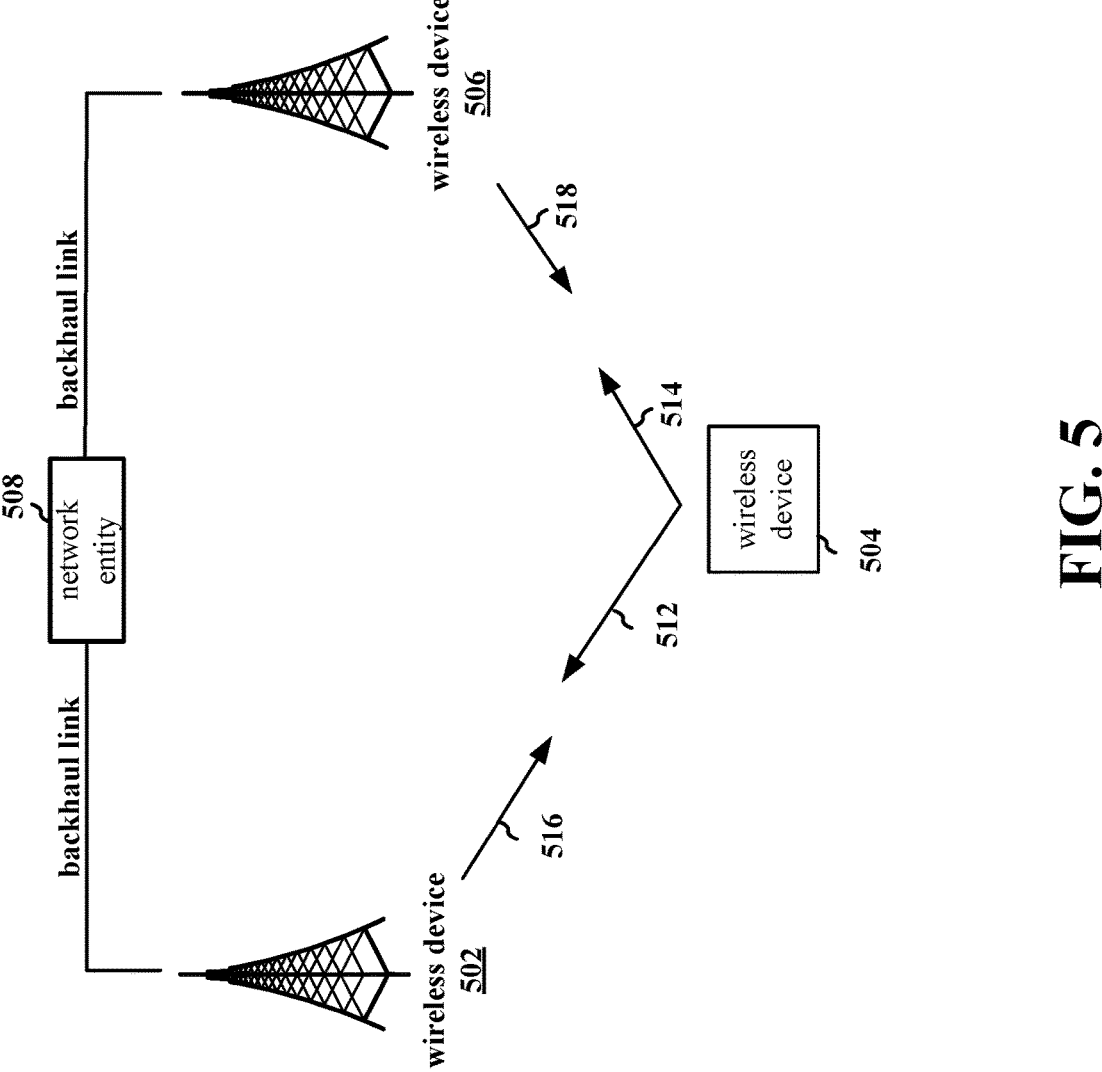
FIG. 5

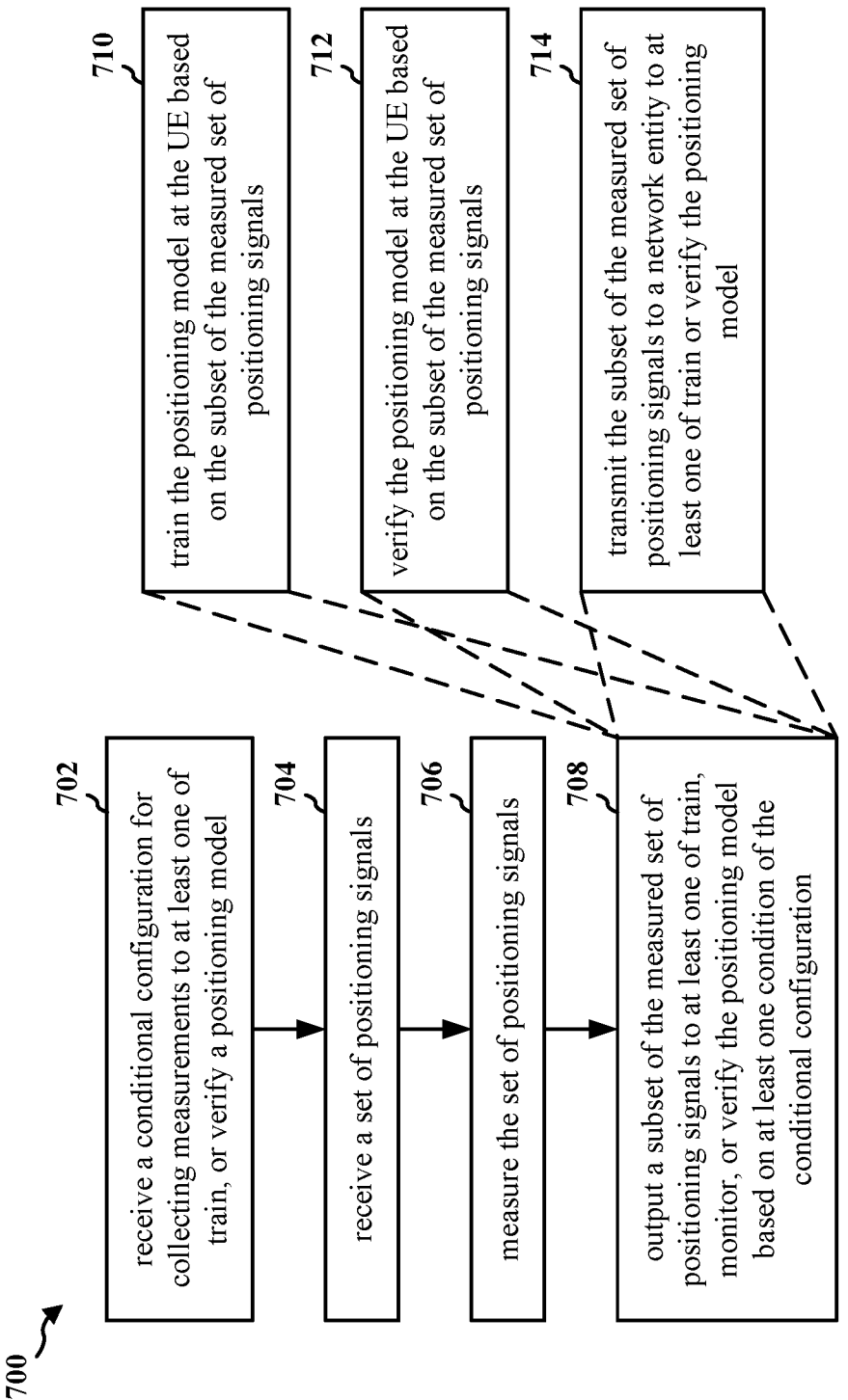

710 train the positioning model at the UE based on the subset of the measured set of positioning signals 712 verify the positioning model at the UE based on the subset of the measured set of positioning signals 714 transmit the subset of the measured set of positioning signals to a network entity to at least one of train or verify the positioning model 702 receive a conditional configuration for collecting measurements to at least one of train, or verify a positioning model 704 receive a set of positioning signals 706 measure the set of positioning signals 708 output a subset of the measured set of positioning signals to at least one of train, monitor, or verify the positioning model based on at least one condition of the conditional configuration

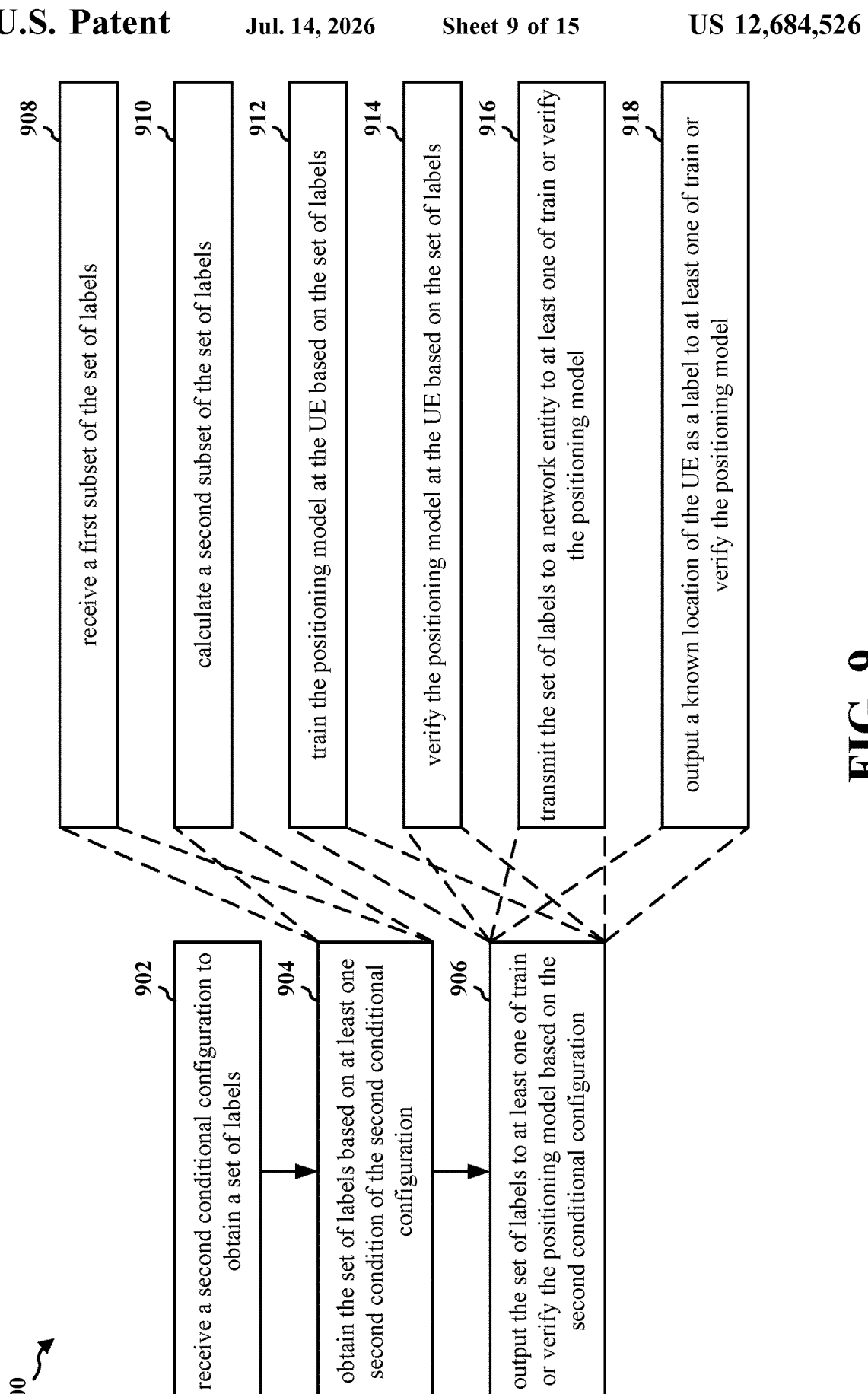

908 receive a first subset of the set of labels 910 calculate a second subset of the set of labels 912 train the positioning model at the UE based on the set of labels 914 verify the positioning model at the UE based on the set of labels 916 transmit the set of labels to a network entity to at least one of train or verify the positioning model 918 output a known location of the UE as a label to at least one of train or verify the positioning model

900

902 receive a second conditional configuration to obtain a set of labels 904 obtain the set of labels based on at least one second condition of the second conditional configuration 906 output the set of labels to at least one of train or verify the positioning model based on the second conditional configuration

1002 configure a conditional configuration for a selection of a subset of measurements of a set of positioning signals to at least one of train or verify a positioning model

1004 transmit the conditional configuration to at least one of train or verify the positioning model

FIG. 10

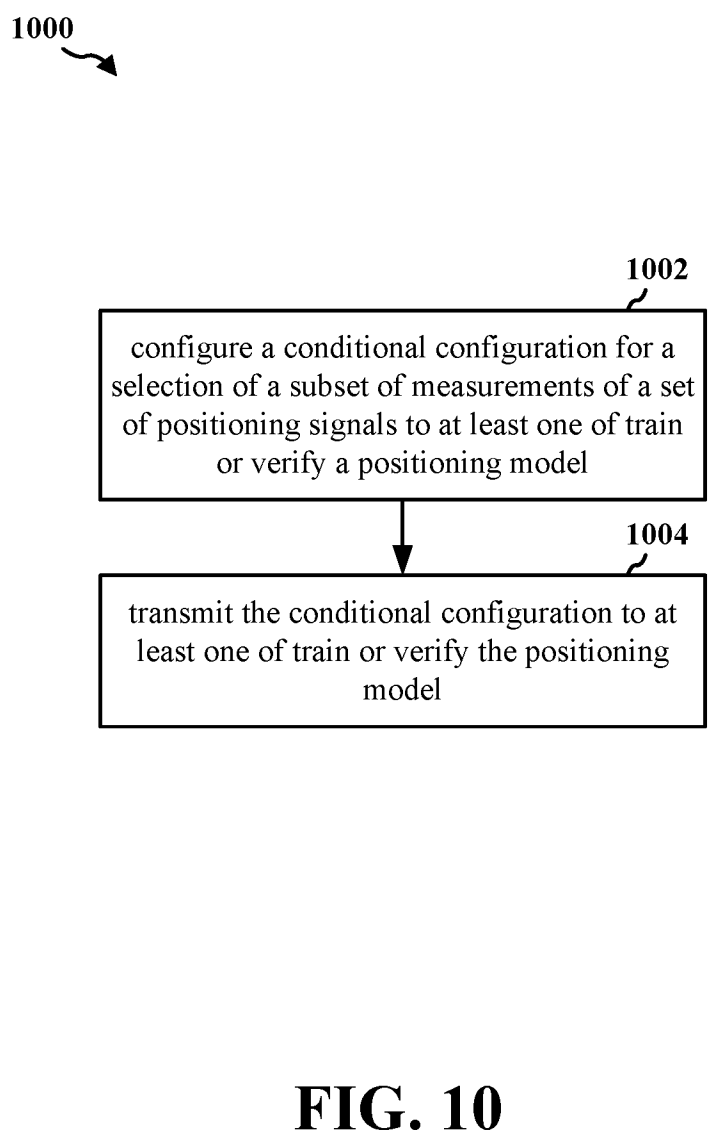

1200

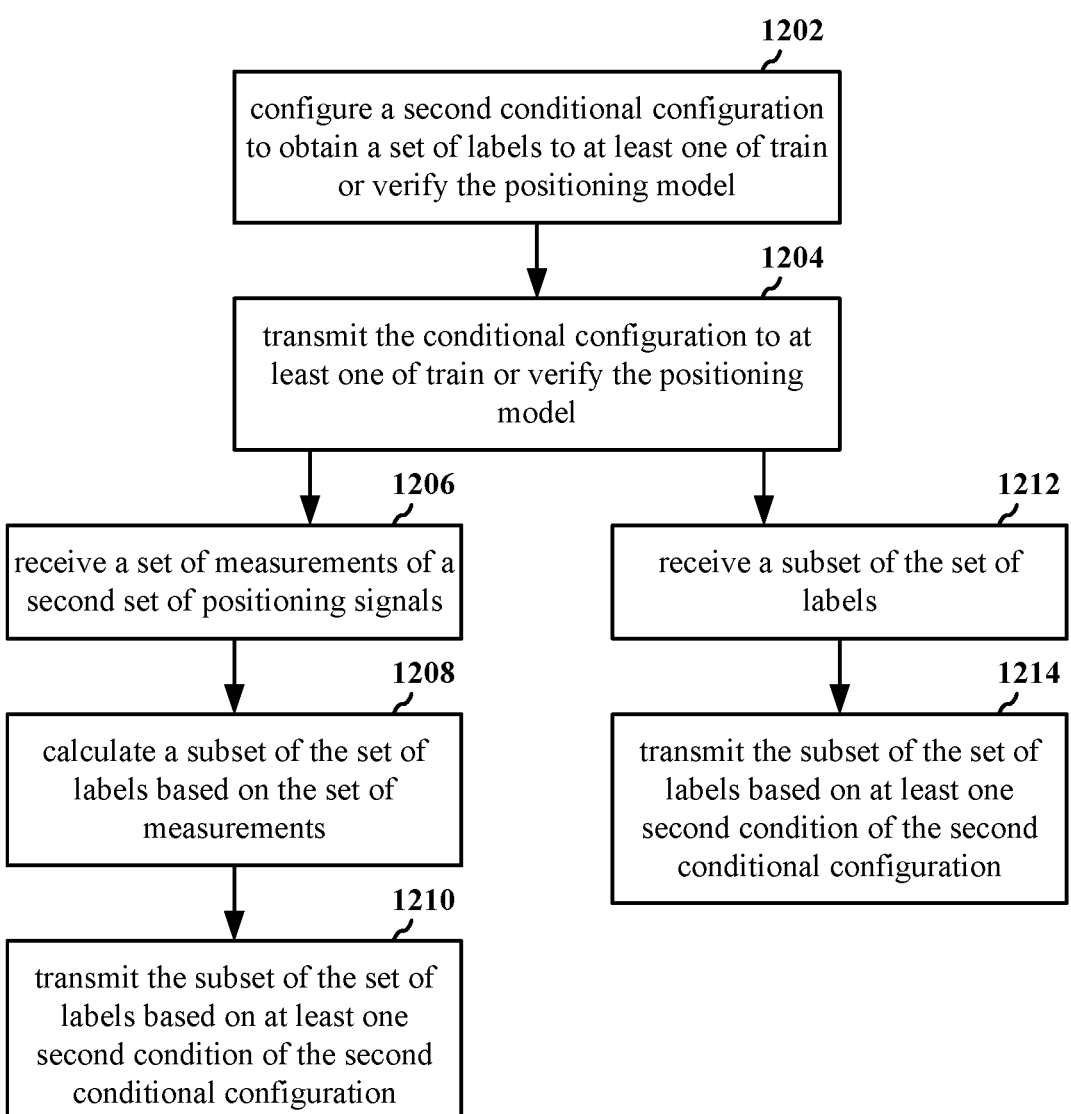

1202 configure a second conditional configuration to obtain a set of labels to at least one of train or verify the positioning model

1204 transmit the conditional configuration to at least one of train or verify the positioning model

1206 receive a set of measurements of a second set of positioning signals

1212 receive a subset of the set of labels

1208 calculate a subset of the set of labels based on the set of measurements

1214 transmit the subset of the set of labels based on at least one second condition of the second conditional configuration

1210 transmit the subset of the set of labels based on at least one second condition of the second conditional configuration

FIG. 12

POSITIONING MEASUREMENT DATA FILTERING

TECHNICAL FIELD

The present disclosure relates generally to communication systems, and more particularly, to a wireless positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The UE may include a positioning reference unit (PRU). The apparatus may receive a conditional configuration for collecting measurements to at least one of train or verify a positioning model. Verification of a model may include verification of a positioning model before, or after activation. The apparatus may receive a set of positioning signals. The apparatus may measure the set of positioning signals. The apparatus may output a subset of the measured set of positioning signals to at least one of train or verify the positioning model based on at least one condition of the conditional configuration. The apparatus may output the subset of the measured set of positioning signals by training the positioning model at the apparatus based on the subset of the measured set of positioning signals based on at least one condition of the conditional configuration. The apparatus may output the subset of the measured set of positioning signals by verifying the positioning model at the apparatus based on the subset of the measured set of positioning signals based on at least one condition of the conditional configuration. The apparatus may output the subset of the measured set of positioning signals by transmitting the subset of the measured set of positioning signals based on at least one condition of the conditional configuration to a network entity to at least one of train or verify the positioning model.

In an aspect of the disclosure, a method, a computer-readable medium, and an apparatus are provided. The apparatus may include a base station, a network entity, a network node, a core network, a set of location servers, or a location management function (LMF). The apparatus may configure a conditional configuration for a selection of a subset of measurements of a set of positioning signals to at least one of train or verify a positioning model. The apparatus may transmit the conditional configuration to at least one of train or verify the positioning model.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating an example of positioning based on positioning signal measurements.

FIG. 7 is a flowchart of a method of wireless communication.

FIG. 9 is a flowchart of a method of wireless communication.

FIG. 10 is a flowchart of a method of wireless communication.

FIG. 12 is a flowchart of a method of wireless communication.

DETAILED DESCRIPTION

Figure 1:
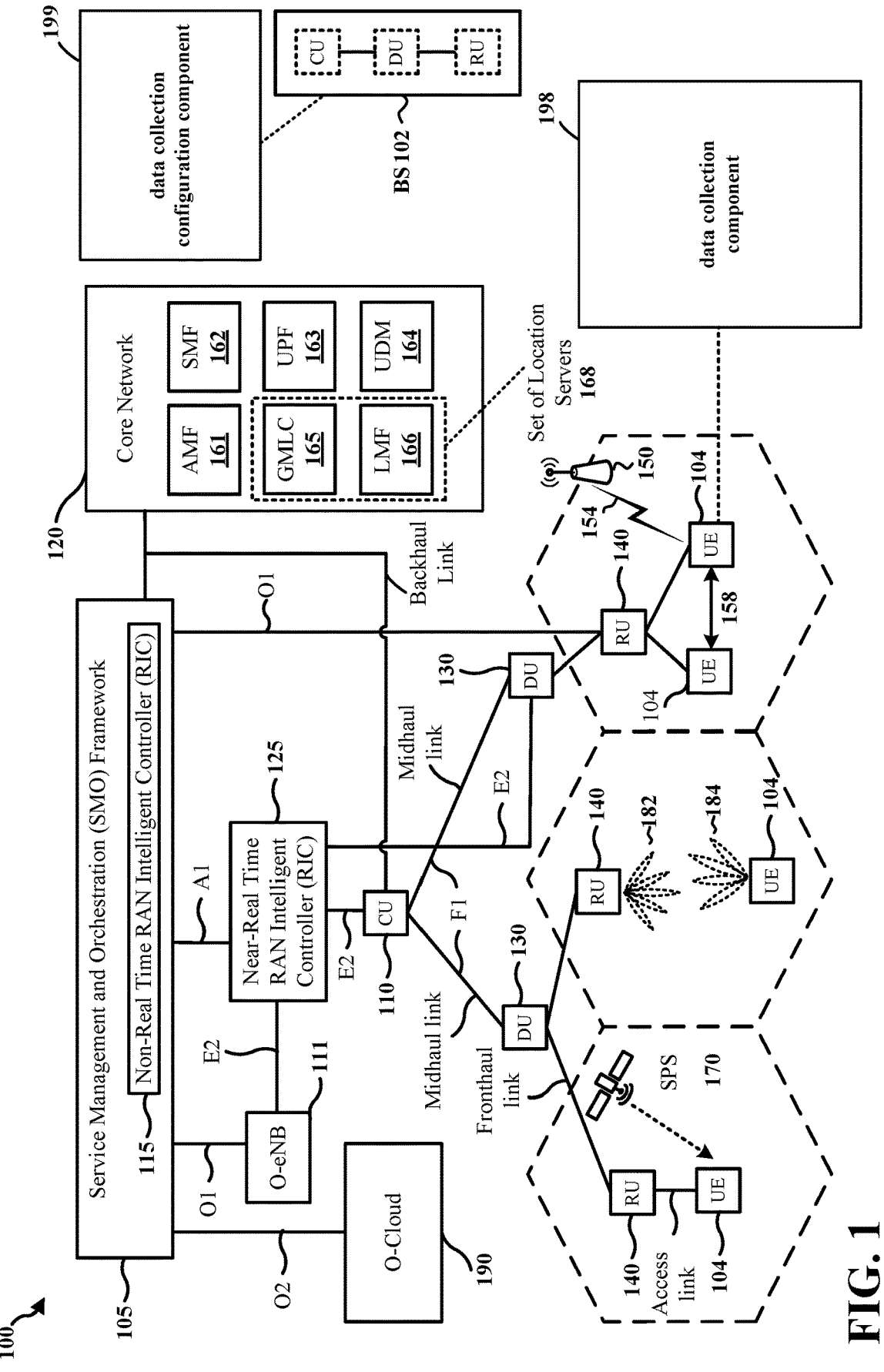
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 1002.11 standards, the IEEE 1002.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to a positioning systems. Some aspects more specifically relate to wireless positioning systems that train positioning models using input data and labels. In some examples, a user equipment (UE) may receive a conditional configuration for collecting measurements to at least one of train or verify a positioning model. The UE may receive a set of positioning signals. The UE may measure the set of positioning signals. The UE may output a subset of the measured set of positioning signals to at least one of train or verify the positioning model based on at least one condition of the conditional configuration. The conditional configuration may include a set of conditions that assist the UE in identifying a subset of the measured set of positioning signals to use. The UE may output the subset of the measured set of positioning signals by training the positioning model at the UE based on the subset of the measured set of positioning signals. The UE may output the subset of the measured set of positioning signals by verifying the positioning model at the UE based on the subset of the measured set of positioning signals. The UE may output the subset of the measured set of positioning signals by transmitting the subset of the measured set of positioning signals to a network entity (e.g., a training entity, a verification entity) to at least one of train or verify the positioning model. In other examples, a network entity may configure a conditional configuration for a selection of a subset of measurements of a set of positioning signals to at least one of train or verify a positioning model. The network entity may transmit the conditional configuration to at least one of train or verify the positioning model. A training entity may train a positioning model by providing the positioning model with a set of inputs and labels such that the positioning model is able to reproduce the labels based on the set of inputs. A verifying entity may verify an accuracy of a positioning model by providing the positioning model with a set of inputs and verifying that the outputs of the positioning model are within a degree of accuracy to the labels. A verifying entity may verify a reliability of a positioning model by checking the distribution/statistics of the model input measurements and compare against training model inputs, or by checking the consistency of model outputs over time. A verifying entity may verify the accuracy/reliability of a positioning model before activating the positioning model (e.g., validating if the model will work as expected) or after activating the positioning model (e.g., validating if the model is continuing to work as expected). A verifying entity may be configured to periodically verify the positioning model, for example once every ten minutes, or once every hour.

In some aspects, techniques for data collection entities and data source entities (e.g., a UE) may be used to ensure high quality measurements and labels for training/verifying of positioning models, for example artificial intelligence machine learning (AI/ML) positioning models. In some aspects, a network entity, such as an LMF, a core entity (CN) or an over the top (OTT) server, may configure data quality and conditions at a UE. The UE may use the configuration to, accordingly, collect measurements and apply labels to the measurements. In some aspects, a UE may be configured with one or more conditions related to labeling for the positioning model. For example, a condition may be that the UE does not do labeling and instead receives labels from other wireless devices, for example the network entity. A condition may be that the UE generates labels based on radio access network (RAT) positioning methods, and/or non-RAT positioning methods. A condition may be that the UE generates labels using a positioning method if an associated error rate of the positioning method is below a threshold. A condition may be that the UE uses generates a label using a plurality of label generation methods and provides an indicator of the plurality of labels in some manner (e.g., grouping the labels in a set, averaging a set of weighted labels, averaging the labels). A condition may be that the UE is configured to associate labels with quality indicators (e.g., error estimates, signal to noise ratios (SNRs)). A condition may be that the UE collects positioning data and reports data that satisfies a set of conditions. In some aspects, a UE may be configured to prioritize positioning measurements (e.g., measurements of a positioning reference signal (PRS), sounding reference signal (SRS), synchronization signal block (SSB)) based on threshold values of one or more factors. In some aspects, the UE may request assistance from a network entity (e.g., assistance data) to ensure high quality data and labels. For example, the UE may request a configuration attribute for a positioning session, and/or the UE may request labelling assistance data that may list prioritization criteria for labels. The UE may receive configurations to generate multiple labels and measurements accordingly. The UE may provide such collected data (e.g., measurements and labels) to a network entity (e.g., an LMF, a CN, an OTT server, a data collection entity, a data repository, a training entity, a verifying entity).

Particular aspects of the subject matter described in this disclosure can be implemented to realize one or more of the following potential advantages. In some examples, by configuring a UE to filter the data it uses to train or verify a positioning model based on a set of conditions of a conditional configuration, the described techniques can be used to increase the quality or reliability of training or verifying a positioning model. Increasing the quality of the inputs and/or the labels used to train or verify a positioning model improves the performance of the positioning model.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an Al interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 1002.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHz) and FR2 (24.25 GHZ-52.6 GHz). Although a portion of FRI is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a data collection component 198 that may be configured to receive a conditional configuration for collecting measurements to at least one of train or verify a positioning model. The data collection component 198 may be configured to receive a set of positioning signals. The data collection component 198 may be configured to measure the set of positioning signals. The data collection component 198 may be configured to output a subset of the measured set of positioning signals to at least one of train or verify the positioning model based on the conditional configuration. The data collection component 198 may be configured to output a subset of the measured set of positioning signals to at least one of train or verify the positioning model based on at least one condition of the conditional configuration. The data collection component 198 may be configured to output the subset of the measured set of positioning signals by verifying the positioning model at the UE 104 based on the subset of the measured set of positioning signals. The data collection component 198 may be configured to output the subset of the measured set of positioning signals by transmitting the subset of the measured set of positioning signals to a network entity (e.g., the base station 102, the core network 120, the LMF 166, an over-the-top (OTT) server) to at least one of train or verify the positioning model. In certain aspects, the base station 102 may have a data collection configuration component 199 that may be configured to configure a conditional configuration for a selection of a subset of measurements of a set of positioning signals to at least one of train or verify a positioning model. The data collection configuration component 199 may be configured to transmit the conditional configuration to at least one of train or verify the positioning model. In other words, the data collection configuration component 199 may configure a conditional configuration for a selection of a subset of measurements of a set of positioning signals to at least one of train or verify a positioning model. The data collection configuration component 199 may transmit the conditional configuration to the data collection component 198, which then selects a subset of a measured set of positioning signals based on the set of conditions of the conditional configuration. This ensures that the data collected by the data collection component 198 maintains a minimum standard to optimize training or verifying of a positioning model using the collected data.

Figures 2A, 2B, 2C, 2D:
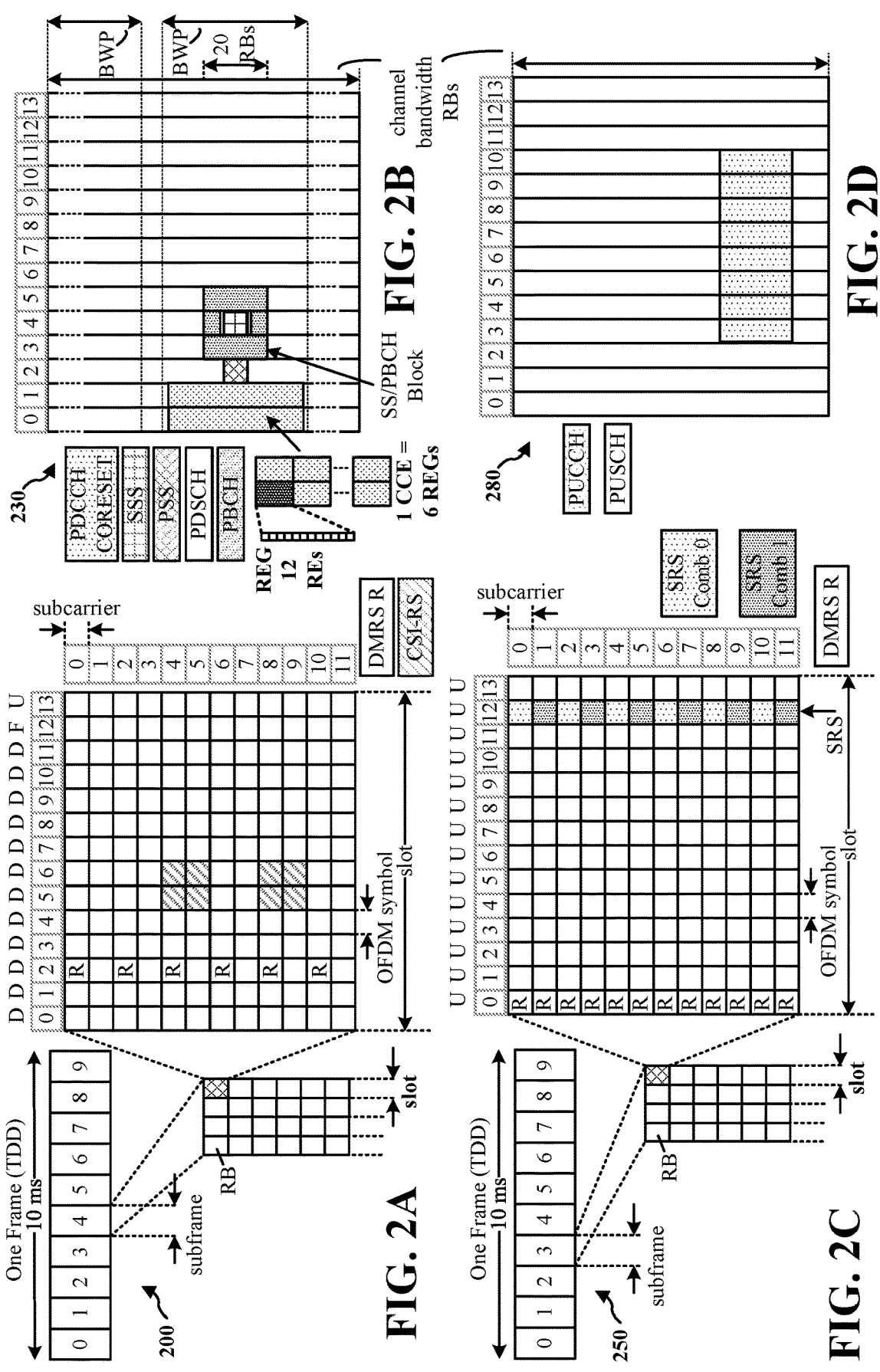
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A. 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
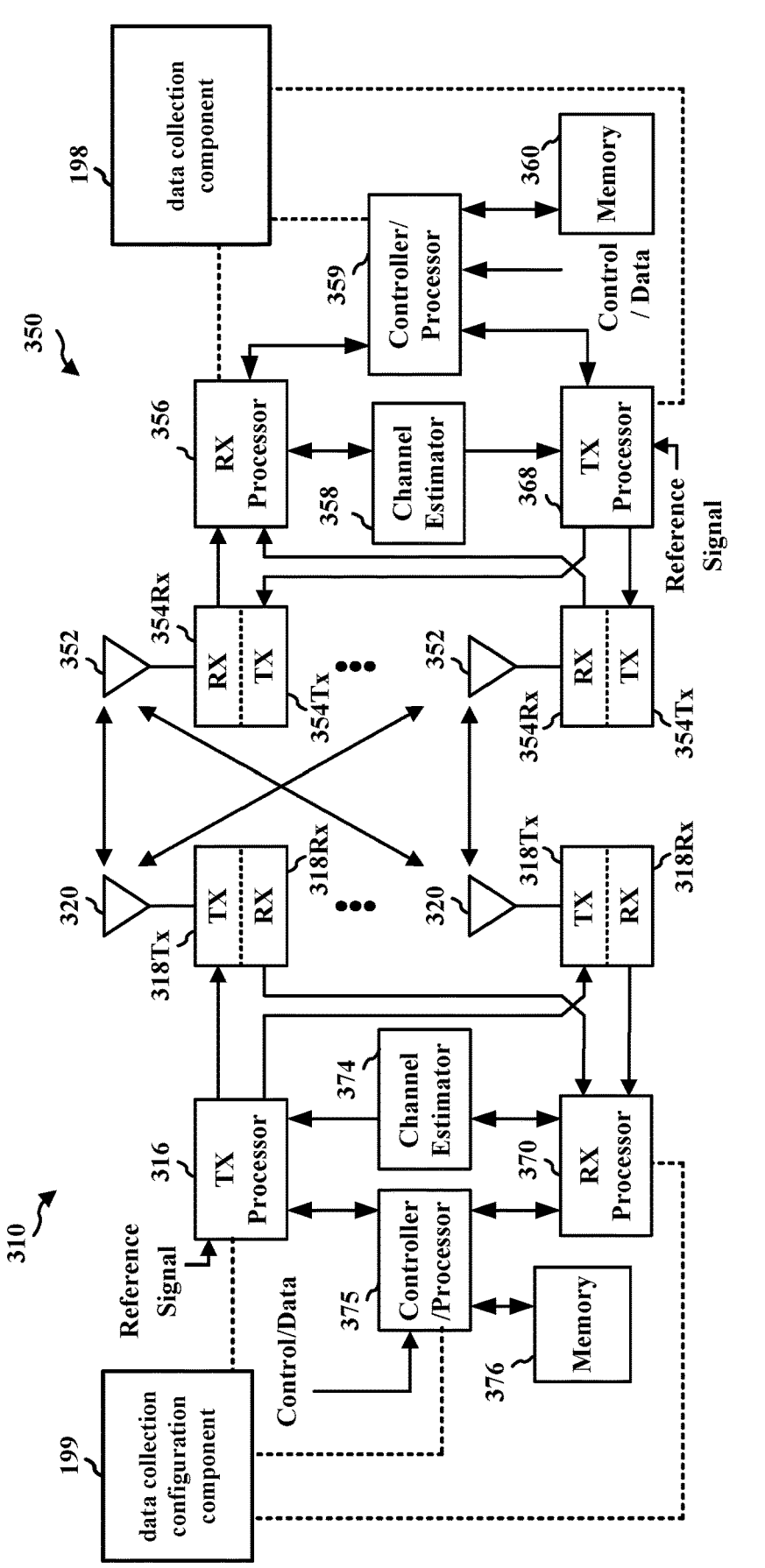
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the data collection component 198 of FIG. 1.

At least one of the TX processor 316, the RX processor 370, and the controller/processor 375 may be configured to perform aspects in connection with the data collection configuration component 199 of FIG. 1.

Figure 4:
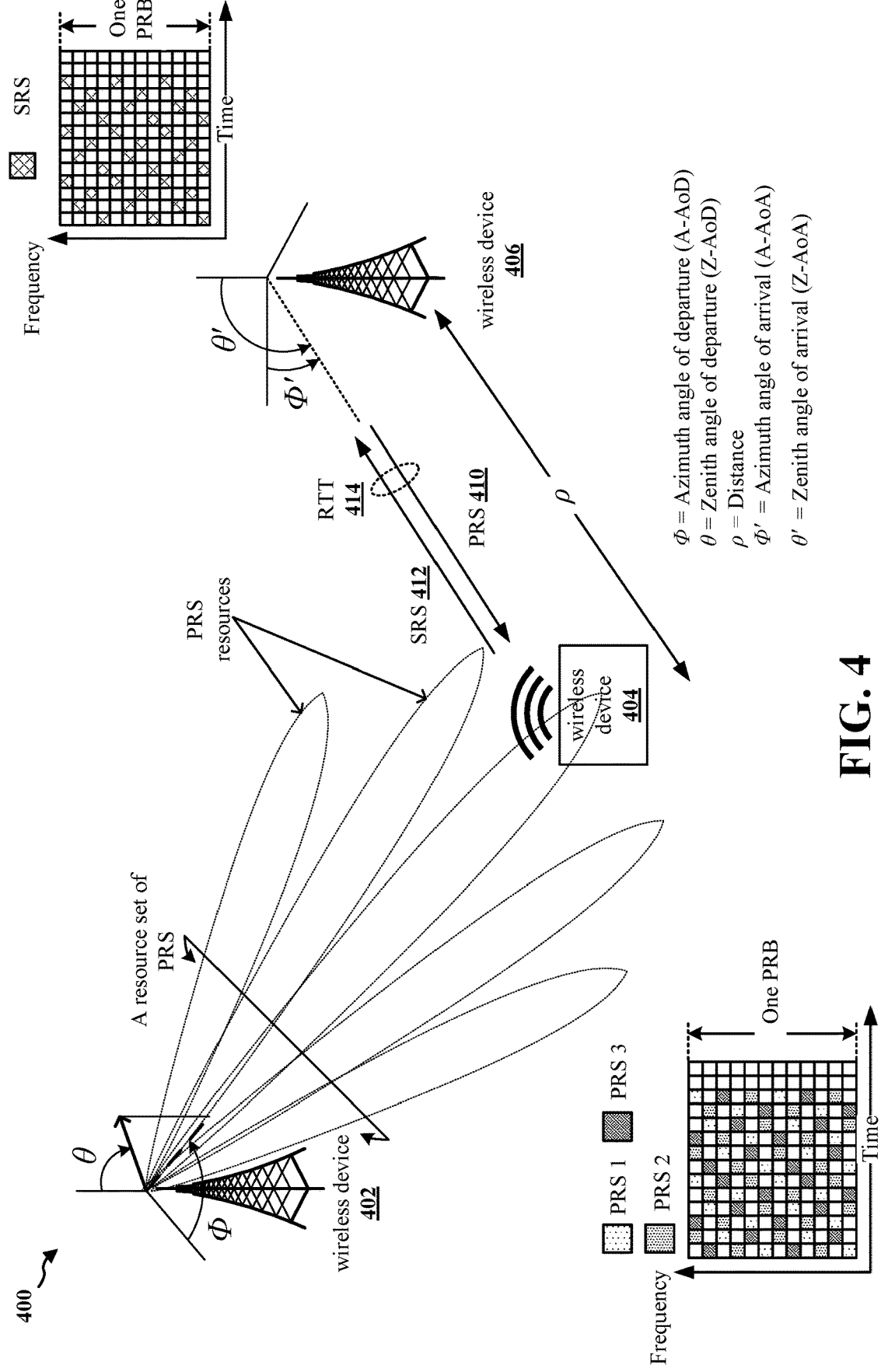
FIG. 4 is a diagram illustrating an example of positioning based on positioning signal measurements.

FIG. 4 is a diagram 400 illustrating an example of a positioning based on positioning signal measurements. A positioning signal may be any reference signal which may be measured to calculate a position attribute or a location attribute of a wireless device, for example a positioning reference signal (PRS), a sounding reference signal (SRS), a channel state information (CSI) reference signal (CSI-RS), or a synchronization and signal block (SSB). The wireless device 402 may be a base station, such as a TRP, or a UE with a known position/location, such as a positioning reference unit (PRU) or a UE with a high-accuracy sensor that may identify the location of the UE, for example a GNSS sensor or a GPS sensor. The wireless device 406 may be a base station or a UE with a known position/location. The wireless device 404 may be a UE or a TRP configured to perform positioning to gather data, for example to gather data to train an artificial intelligence machine learning (AI/ML or AIML) model, test positioning signal strength or test positioning noise attributes in an area. In some aspects, the UE may be a positioning reference unit (PRU) with a known location, used to train or verify the accuracy of a positioning model.

The wireless device 404 may transmit UL-SRS 412 at time $T_{SRS\_TX}$ and receive DL positioning reference signals (PRS) (DL-PRS) 410 at time $T_{PRS\_RX}$. The wireless device 406 may receive the UL-SRS 412 at time $T_{SRS\_RX}$ and transmit the DL-PRS 410 at time $T_{PRS\_TX}$. The wireless device 404 may receive the DL-PRS 410 before transmitting the UL-SRS 412, or may transmit the UL-SRS 412 before receiving the DL-PRS 410. In both cases, a positioning server (e.g., location server(s) 168, LMF 166) or the wireless device 404 may determine the RTT 414 based on $\|T_{SRS\_RX}-$ $T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple wireless devices 402, 406 and measured by the wireless device 404, and the measured TRP Rx-Tx time difference measurements (i.e., $|T_{SRS\_RX}-T_{PRS\_TX}|$) and UL-SRS-RSRP at multiple wireless devices 402, 406 of uplink signals transmitted from wireless device 404. The wireless device 404 may measure the UE Rx-Tx time difference measurements (and optionally DL-PRS-RSRP of the received signals) using assistance data received from the positioning server, and the wireless devices 402, 406 may measure the gNB Rx-Tx time difference measurements (and optionally UL-SRS-RSRP of the received signals) using assistance data received from the positioning server. The measurements may be used at the positioning server or the wireless device 404 to determine the RTT. The RTT may be used to estimate the location of the wireless device 404. Other methods are possible for determining the RTT, such as for example using DL-TDOA and/or UL-TDOA measurements.

DL-AoD positioning may make use of the measured DL-PRS-RSRP of downlink signals received from multiple wireless devices 402, 406 at the wireless device 404. The wireless device 404 may measure the DL-PRS-RSRP of the received signals using assistance data received from the positioning server, and the resulting measurements may be used along with the azimuth angle of departure (A-AoD), the zenith angle of departure (Z-AoD), and/or other configuration information to locate the wireless device 404 in relation to the neighboring wireless devices 402, 406.

DL-TDOA positioning may make use of the DL reference signal time difference (RSTD) (and optionally DL-PRS-RSRP) of downlink signals received from multiple wireless devices 402, 406 at the wireless device 404. The wireless device 404 may measure the DL RSTD (and optionally DL-PRS-RSRP) of the received signals using assistance data received from the positioning server, and the resulting measurements may be used along with other configuration information to locate a position/location the wireless device 404 in relation to the neighboring wireless devices 402, 406.

UL-TDOA positioning may make use of the UL relative time of arrival (RTOA) (and optionally UL-SRS-RSRP) at multiple wireless devices 402, 406 of uplink signals transmitted from wireless device 404. The wireless devices 402, 406 may measure the UL-RTOA (and optionally UL-SRS-RSRP) of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices 402, 406 of uplink signals transmitted from the wireless device 404. The wireless devices 402, 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

FIG. 5 is a diagram 500 illustrating a network entity 508 that may be configured to coordinate a wireless device 502 and a wireless device 506 to perform positioning with a wireless device 504. The location of the wireless device 502 and the wireless device 506 may be known to at least one device, such as the wireless device 502, the wireless device 504, the wireless device 506, and/or the network entity 508. The wireless device 502 may be a base station, a gNB, or a TRP. The wireless device 506 may be a base station, a gNB, or a TRP. The wireless device 504 may be a UE. In some aspects, the UE may be a PRU. A PRU may be a UE with a known location. For example, the PRU may be affixed in a known location or may be placed in a known location for a period of time, or the PRU may have a set of sensors (e.g., high-accuracy GNSS sensor) that may be used to accurately calculate the location of the PRU. The network entity 508 may be connected to the wireless device 502 and the wireless device 506 via a physical link, for example a backhaul link or a midhaul link, or via a wireless link, such as an air interface (a UE-UTRAN (Uu)) link. The network entity 508 may be part of a core network, such as an LMF or a set of location servers. The network entity 508 may configure positioning occasions between the wireless device 502, the wireless device 504, and the wireless device 506.

To perform positioning, the network entity 508 may configure one or more of the wireless devices to transmit positioning signals at one another. For example, the wireless device 504 may transmit the set of positioning signals 512 at the wireless device 502. The set of positioning signals 512 may be a set of SRSs, SSBs, or CSI-RSs. The wireless device 502 may measure the set of positioning signals 512. The wireless device 502 may transmit the set of positioning signals 516 at the wireless device 504. The set of positioning signals 516 may be a set of PRSs, SSBs, or CSI-RSs. The wireless device 504 may measure the set of positioning signals 516. The wireless device 504 may transmit a set of positioning signals 514 at the wireless device 506. The set of positioning signals 514 may be a set of SRSs, SSBs, or CSI-RSs. The wireless device 506 may measure the set of positioning signals 514. The wireless device 506 may transmit a set of positioning signals 518 at the wireless device 504. The set of positioning signals 518 may be a set of PRSs, SSBs, or CSI-RSs. The wireless device 504 may measure the set of positioning signals 518. One or more of the wireless devices may measure the received positioning signals to calculate a positioning measurement that may be used to calculate a position/location of the wireless device 504, or may be used to calculate a position/location of the wireless device 504. For example, if the location of the wireless device 502 and the location of the wireless device 506 are known, the location of the wireless device 504 may be calculated based on a RTT between the wireless device 502 and the wireless device 504, and a RTT between the wireless device 504 and the wireless device 506. In another example, the wireless device 504 may calculate an angle of arrival (AoA) or an angle of departure (AoD) of the set of positioning signals 516, and may calculate an AoA or an AoD of the set of positioning signals 518. The calculated AoAs and/or AoDs may be used to calculate a position of the wireless device 504 if the location of the wireless device 502 and the location of the wireless device 506 are also known. Other measurements, such as RTOA, line-of-sight (LOS) identification (identifying whether there is a direct line-of-sight path between wireless devices), or multi-cell round trip time (multi-RTT) calculations may be performed to calculate the position of the wireless device 504, or to calculate a measurement that may be used to calculate the position of the wireless device 504.

In some aspects, a positioning model may be used to calculate one or more positioning metrics based on the measurements. For example, based on the measurements of the set of positioning signals 512 and/or the set of positioning signals 514 transmitted by the wireless device 504, a position/location of the wireless device 504 may be calculated or estimated, or an intermediate measurement that may be used to calculate the position/location of the wireless device 504 may be calculated or estimated. A positioning model may be trained using artificial intelligence (AI)/machine learning (ML) (AI/ML or AIML), based on a set of inputs (e.g., measurements of positioning signals, assistance information associated with the positioning signals) and a set of labels. A positioning signal may include any reference signal transmitted from a wireless device, such as a PRS, a SRS, an SSB, or a CSI-RS. An RS transmitted from a UE, such as a PRU, may be referred to as an uplink positioning signal, or an UL positioning signal. An RS transmitted from a base station, or TRP, may be referred to as a downlink positioning signal, or a DL positioning signal. A measurement may be a channel impulse response (CIR), a channel frequency response (CFR), or other measurement used for performing positioning on a target wireless device. A label may be a calculated, derived, or given (i.e., known) expected result associated with a set of inputs, such as a position/location of a wireless device 504 or an intermediate measurement (e.g., a timing measurement, an angle measurement, a LOS identification) that may be used to calculate the position/location of the wireless device 504. A set of inputs and a set of labels may be used for generating and/or training a positioning model using AI/ML.

When training a positioning model, measurements of positioning signals as inputs, clean or noisy labels (clean labels may have a quality metric greater or equal to a threshold, noisy labels may have a quality metric less than or equal to the threshold) as expected outputs, and training data assistance information as inputs or expected outputs. The positioning model may operate on any wireless device based on a set of inputs. For example, the wireless device 502 may have a positioning model configured to accept a set of positioning measurements and generate an estimate of a position/location of the wireless device 504. In another example, the wireless device 502 may have a positioning model configured to accept a set of positioning measurements and generate an intermediate measurement (e.g., a timing measurement, an angle measurement, a LOS identification) that may be used (by the wireless device 502, or another entity, such as the network entity 508, the wireless device 504, or the wireless device 506) to calculate the position/location of the wireless device 504. In another example, the network entity 508 may have a positioning model configured to accept a set of positioning measurements and generate an estimate of a position/location of the wireless device 504, or generate an intermediate measurement that may be used to calculate the position/location of the wireless device 504. In another example, the wireless device 504 may have a positioning model configured to accept a set of positioning measurements and generate an estimate of a position/location of the wireless device 504, or generate an intermediate measurement that may be used to calculate the position/location of the wireless device 504. In some aspects, the positioning measurements may be aggregated by the entity with the positioning model, for example the network entity 508 may aggregate measurements of the set of positioning signals 512 from the wireless device 502, measurements of the set of positioning signals 514 the wireless device 506 to use as inputs to a positioning model, measurements of the set of positioning signals 516 from the wireless device 504, and/or measurements of the set of positioning signals 518 from the wireless device 504.

A positioning model may be trained on a wireless device that performs positioning, such as the wireless device 502, the wireless device 504, the wireless device 506 and/or the network entity 508, or may be trained on an offline device, such as an over-the-top (OTT) server. The inputs to the positioning model may include measurements of positioning signals, such as measurements of SRS, PRS, SSB, and/or CSI-RS. The inputs to the measurements may include assistance information associated with the measured positioning signals, such as BWP of a positioning signal resource, number of TRPs, beam information, positioning signal configuration. The labels/outputs for the positioning model may include a location, or an intermediate measurement.

In some aspects, a positioning model may be configured to use measurements of positioning signals transmitted from a wireless device to calculate a position of the wireless device 504, or to calculate an intermediate measurement that may be used to calculate the position of the wireless device 504. The positioning model may be trained via a training entity, and may be used at the wireless device 502, at the wireless device 504, at the wireless device 506, or at the network entity 508. For example, a positioning model at the wireless device 504 may be configured to calculate the location of the wireless device 504 based on measurements of the set of positioning signals 516 and/or the set of positioning signals 518. In another example, the wireless device 502 may transmit a set of intermediate measurements to the network entity 508 so that the network entity 508 may calculate the location of the wireless device 504 based on the set of intermediate measurements. In another example, the wireless device 504 may transmit measurements of the set of positioning signals 516 and/or the set of positioning signals 518 to the network entity 508. The positioning model may be at the network entity 508. The positioning model at the network entity 508 may calculate the location of the wireless device 504 based on the transmitted measurements of the set of positioning signals 516 and/or the set of positioning signals 518 from the wireless device 504, the transmitted measurements of the set of positioning signals 512 from the wireless device 502, and/or the transmitted measurements of the set of positioning signals 514 from the wireless device 506. In other words, any of the wireless device 502, the wireless device 504, and/or the wireless device 506 may assist the network entity 508 in performing positioning using a trained positioning model.

In some aspects, a positioning model may be site-specific. For example, a first positioning model may be trained in a location, or a set of locations, associated with a first site having a first set of borders, and a second positioning model may be trained in a location, or a set of locations, associated with a second site having a second set of borders. A wireless device may be configured to use one of a plurality of site-specific positioning models. For example, the wireless device may select a site-specific positioning model based on its location, or may select a site-specific positioning model based on an indicator, for example a signal transmitted from the network entity 508 that indicates that a particular site-specific positioning model from a plurality of site-specific positioning models be selected.

Measurements of positioning signals may be performed by measuring channels between a target device (e.g., the wireless device 504) and a set of network nodes (e.g., the wireless device 502 and the wireless device 506). The wireless device 504 may transmit a positioning signal, such as an SRS, an SSB, or a CSI-RS. The wireless device 502 and/or the wireless device 506 may measure the positioning signal for data collection purposes to train a positioning model. The wireless device 504 and/or the wireless device 506 may transmit a positioning signal, such as a PRS, an SSB, or a CSI-RS. The wireless device 504 may measure the positioning signal for data collection purposes to train the positioning model. The wireless device 502, the wireless device 504, and/or the wireless device 506 may measure a positioning signal resource in a plurality of ways, for example the measurement may be a channel impulse response (CIR), a channel frequency response (CFR), a power delay profile (PDP), a set of reflection paths, a reception-transmission (Rx-Tx) time difference, a received signal strength indicator (RSSI), a reference signal received power (RSRP), a reference signal received power per path (RSRPP), a reference signal received quality (RSRQ), a time of arrival (ToA), a reference signal time difference (RSTD), or an angle of departure (AoD).

While the diagram 500 illustrates two positioning neighbor wireless devices, wireless device 502 and wireless device 506, configured to perform positioning with one positioning target wireless device, wireless device 504, to calculate a position/location of the wireless device 504, any number of positioning neighbor wireless devices may be configured to perform positioning with any number of positioning target wireless devices. For example, four positioning neighbor wireless devices may be configured to calculate the position/location of two positioning target wireless devices, three positioning neighbor wireless devices may be configured to calculate the position/location of one positioning target wireless device, or two positioning neighbor wireless devices may be configured to calculate the position/location of one positioning target wireless device.

In some aspects, the measurements collected by a wireless device may not be adequate to train a positioning model. For example, a barrier that blocks wireless signals may be placed between the wireless device 504 and the wireless device 502, or between the wireless device 504 and the wireless device 502, which may result in a severe degradation in the quality of measured signals. In some aspects, a data collection entity may be configured to request data (e.g., measurements and positioning labels) with specified quality and/or conditions. In some aspects, a data source entity (e.g., a UE, a PRU) may be configured to filter out measurements and/or labels that do not adhere to the specified quality and/or conditions. As a result, the data source entity may report clean positioning measurements and/or labels for use in training a positioning entity. In other aspects, such clean positioning measurements and/or labels may be used to verify the accuracy of a positioning model. In some aspects, conditions and/or criteria for data collection, selection, and/or prioritization may be utilized at a UE to improve the quality of data collected to train and/or verify the accuracy of a positioning model.

For example, the network entity 508 may configure data quality and/or conditions for the wireless device 504. In some aspects, a training entity, such as an OTT server, may transmit a request to the network entity 508 to collect high quality data for training and/or verifying a positioning model, and in response the network entity 508 may configure data collection for the wireless device 504 to ensure that the requested quality and/or conditions are achieved. In another example, the wireless device 504 may request for the network entity 508 to ensure that the collected data has a specified data quality and/or conditions. In other words, the wireless device 504 may be a training entity, or may collect data for a training entity, and may request certain configurations for the positioning signals transmitted to the wireless device 504 and/or certain assistance data or labeling assistance from the network entity 508. The Qualcomm Ref. No. 2305274 33 wireless device 504 may transmit a request for positioning signal configurations that satisfy a set of conditions (i.e., have a specified data quality and/or conditions). The wireless device 504 may transmit a request for labeling assistance from the network entity 508 based on a specified set of data quality and/or conditions. The wireless device 504 may also be referenced as a data collection entity, or a data source entity.

Figure 6:
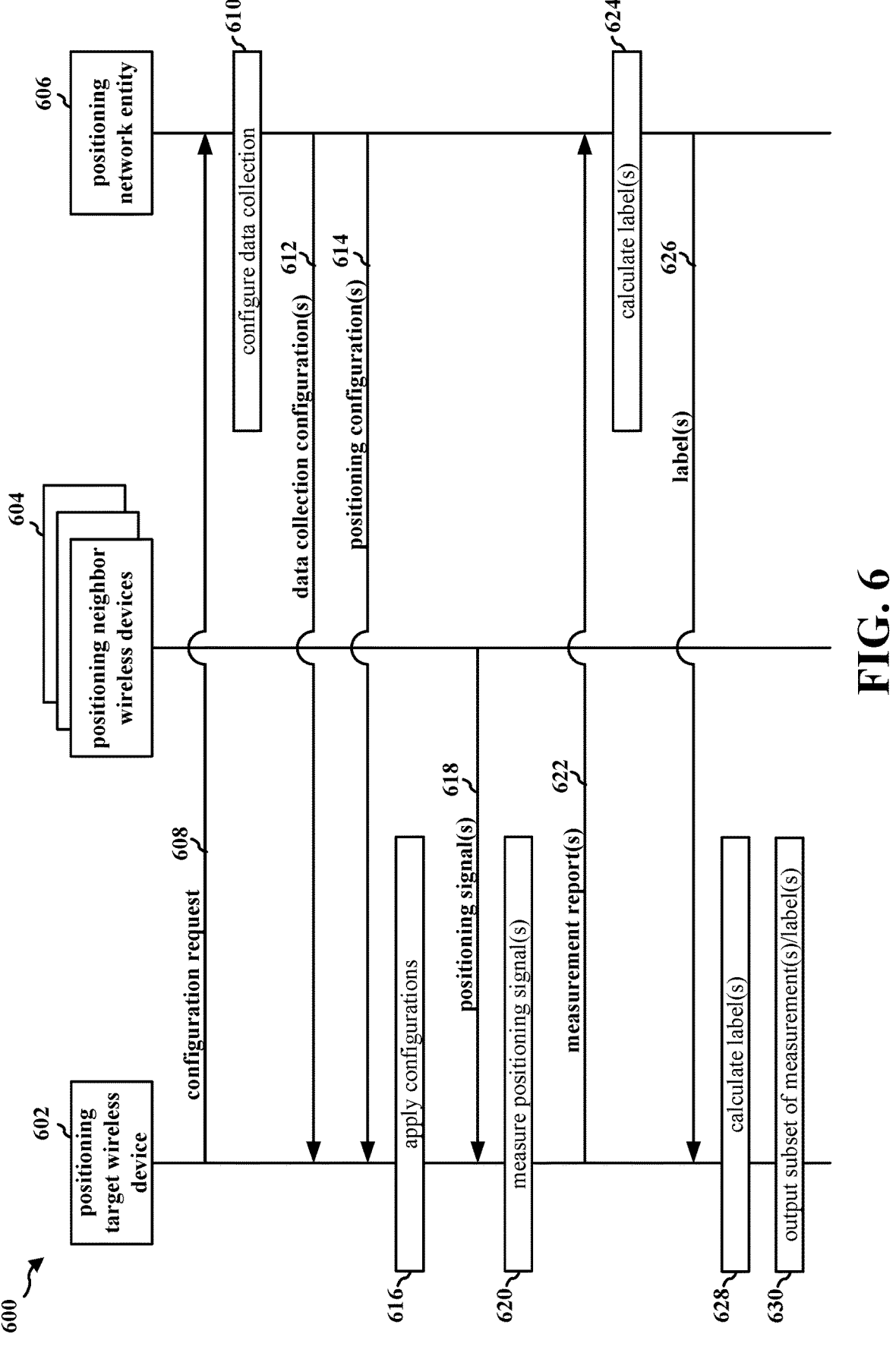
FIG. 6 is a connection flow diagram illustrating an example of a data collection entity filtering measurements and/or labels for training and/or verifying a positioning model.

FIG. 6 is a connection flow diagram 600 illustrating an example of communications between a positioning target wireless device 602, a set of positioning neighbor wireless devices 604, and a positioning network entity 606. The positioning target wireless device 602 may be a UE. The UE may be a PRU with a known location. The set of positioning neighbor wireless devices 604 may include a set of base stations and/or a set of TRPs configured to transmit positioning signals at the positioning target wireless device 602. The positioning network entity 606 may include an LMF, one or more location servers, a core entity (CN) or an over the top (OTT) server. The positioning network entity 606 may be configured to configure positioning occasions between the positioning target wireless device 602 and the set of positioning neighbor wireless devices 604. The positioning network entity 606 may be configured to configure data collection configuration settings for the positioning target wireless device 602 to measure, select, and output measurements and/or labels for training and/or verifying a positioning model. The positioning target wireless device 602 may be configured to ensure that the measurements and/or labels collected by the positioning target wireless device 602 adheres to a set of quality and/or conditions in accordance with a configuration.

In some aspects, the positioning target wireless device 602 may transmit a configuration request 608 to the positioning network entity 606. The positioning network entity 606 may receive the configuration request 608 from the positioning target wireless device 602. The configuration request 608 may include an indicator for the positioning network entity 606 to configure positioning signal configurations to ensure that measurements collected by the positioning target wireless device 602 and/or labels calculated based on the collected measurements adhere to a set of quality conditions for data collection. The configuration request 608 may include a set of positioning signal configuration attributes. A positioning signal configuration attribute may include an indicator of a bandwidth part (BWP), a number of resources, a range of a number of resources, a number of TRPs, a range of a number of TRPs, a number of positioning frequency layers (PFLs), a range of a number of PFLs, a set of positioning signal muting masks, and/or a set of processing gap conditions. A range may be open-ended or may be bounded by threshold values. For example, a range may include values that are greater or equal to a value, less than or equal to a n value umber, or between two values.

The configuration request 608 may include an indicator for the positioning network entity 606 to provide labeling assistance. The indicator may include a list of criteria for prioritizing the labeling assistance. The configuration request 608 may include an indicator for the positioning network entity 606 to calculate a set of labels based on a radio access technology (RAT) method using positioning measurements that satisfy a set of threshold ranges (e.g. $\geq \gamma_{,}$). The threshold ranges may include an RSRP threshold range, a signal to noise ratio (SNR) threshold range, a signal to interference and noise ratio (SINR) threshold range, a delay spread threshold range, a Rician factor threshold range, a Doppler spread threshold range, and/or a multipath component threshold range (e.g., a number of multipath components satisfying a threshold). In one aspect, the multipath component threshold range may be a minimum number of detected paths (i.e., detected paths>N). The configuration request 608 may include an indicator for the positioning network entity 606 to ensure that a label error rate satisfies a threshold range (e.g., does not exceed a threshold value). A label error rate may be calculated as a single rate, a set of label error rates, or a statistical value of a set of label error rates (e.g., a mean, a median, an average of weighted values of label error rates). The configuration request 608 may include an indicator for the positioning network entity 606 to calculate a set of labels using a plurality of calculation methods (e.g., calculate a location of the positioning target wireless device 602 based on RTT. RSTD, and multi-RTT measurements). The configuration request 608 may include an indicator for the positioning network entity 606 to report the set of labels individually (e.g., an array of labels) or a statistical value of the set of labels (e.g., mean, median, average of weighted values of the set of labels). The configuration request 608 may include an indicator for the positioning network entity 606 to calculate a label quality for each calculated label. In some aspects, the configuration request 608 may include a set of label quality standards for each calculated label (e.g., label error estimation, statistical value for a set of labels, residual error rate from a positioning solution). In some aspects, a residual error rate may be a residual loss after solving a positioning equation using an iterative optimization algorithm. For example, a Kalman post-estimation/pos-fit residual error. In some aspects, the configuration request 608 may indicate for the positioning network entity 606 to report a label error rate via a representative indicator, for example a low error rate indicator for error rates that satisfy a first threshold range, a medium error rate indicator for error rates that satisfy a second threshold range, and a high error rate indicator for error rates that satisfy a third threshold range. In some aspects, the positioning network entity 606 and the positioning target wireless device 602 may conduct a long-term evolution (LTE) positioning protocol (LPP) capability exchange procedure that includes the configuration request 608. In other words, the positioning target wireless device 602 may transmit an LPP message (e.g., as part of an LPP annex (LPPa) protocol) that includes the configuration request 608. The configuration request 608 may include an indicator for the positioning network entity 606 to configure a set of data collection configurations for the positioning target wireless device 602.

At 610, the positioning network entity 606 may configure data collection for the positioning target wireless device 602. In some aspects, the positioning network entity 606 may configure data collection for the positioning target wireless device 602 based on a set of data quality conditions provided by a network (e.g., following a network standard, based on a calculation by a network entity). In some aspects, the positioning network entity 606 may configure data collection for the positioning target wireless device 602 based on the configuration request 608 received from the positioning target wireless device 602. The positioning network entity 606 may transmit a set of data collection configurations 612 to the positioning target wireless device 602 based on the configuration performed at 610. The positioning target wireless device 602 may receive the set of data collection configurations 612 from the positioning network entity 606.

The set of data collection configurations 612 may include an indicator of a set of conditions that may assist the positioning target wireless device 602 in selecting a subset of measured positioning signals to use/report for positioning. In some aspects, the set of conditions may assist the positioning target wireless device 602 in selecting a subset of labels to use/report for positioning. The set of data collection configurations 612 may include a single conditional configuration with a single set of conditions for both measurements and labels, or a plurality of conditional configurations with a plurality of sets of conditions, where some sets of conditions are associated with conditions for the measurements and some sets of conditions are associated with conditions for the labels.

The set of conditions may include a set of measurement types for the positioning target wireless device 602 to collect. The set of measurement types may include, for example, an RSTD, an RSRP, an RSRPP, a timing measurement associated with a path, additional path information, delay profile (DP), power delay profile (PDP), a channel impulse response (CIR) timing measurement, a CIR power measurement, a CIR phase measurement, a channel frequency response (CFR) timing measurement, a CFR power measurement, a CFR phase measurement, timing information of a CIR, power information of a CIR. phase information of a CIR, frequency information of a CFR, power information of a CFR, and/or phase information of a CFR. A measurement may be associated with a path, for example a timing measurement may be generated for each path detected by the positioning target wireless device 602. The set of conditions may include an indicator of a set of non-RAT positioning methods for the positioning target wireless device 602 to use to calculate a position/location of the positioning target wireless device 602. The set of non-RAT positioning methods may include a GNSS positioning method, a GPS positioning method, a LIDAR positioning method, a BLE positioning method, a WLAN positioning method, and/or a motion sensor (e.g., inertial motion unit (IMU)) positioning method. The set of conditions may include an indicator of a set of RAT positioning methods for the positioning target wireless device 602 to use to calculate a position/location of the positioning target wireless device 602. The set of RAT positioning methods may include a DL-TDoA positioning method, an UL-AoD positioning method, a multi-RTT positioning method, an UL-TDoA positioning method, and/or an UL-AoA positioning method. The set of conditions may include an indicator for the positioning target wireless device 602 to combine an estimate of a position/location of the positioning target wireless device 602 using a combination of methods (e.g., a combination of RAT methods, a combination of non-RAT methods, a combination of both RAT and non-RAT methods), for example by averaging out a set of calculated locations, or by calculating a weighted average of a set of calculated locations. The set of conditions may include an indicator for the positioning target wireless device 602 to prioritize measurements in accordance with a set of conditions. The set of conditions for measurements may include, for example, threshold ranges for the measurements (e.g., RSRP threshold range, SNR threshold range, SINR threshold range, delay spread threshold range, Rician factor threshold range, Doppler spread threshold range, multipath component threshold range). The set of conditions may include an indicator for the positioning target wireless device 602 to prioritize labels in accordance with a set of conditions. The set of conditions for labels may include an indicator for the positioning target wireless device 602 to not calculate labels, an indicator for the positioning target wireless device 602 to calculate labels based on a set of RAT-based methods, an indicator for the positioning target wireless device 602 to calculate labels based on a set of non-RAT based methods, an indicator for the positioning target wireless device 602 to calculate labels using measurements that satisfy a threshold range, an indicator for the positioning target wireless device 602 to calculate labels having a label error rate (or a statistical calculation of a set of label error rates) that satisfy a threshold range, an indicator for the positioning target wireless device 602 to calculate labels using a plurality of label calculation methods, an indicator for the positioning target wireless device 602 to report a set of labels individually or as a statistical calculation of the set of labels, and/or an indicator for the positioning target wireless device 602 to report a set of labels with label quality indicators (e.g., label error estimation, average SNR, residual error from positioning solution, low, medium, high). The set of data collection configurations 612 may include a plurality of configurations, where each of the plurality of configurations is associated with a set of quality conditions for measurements and/or labels. The positioning target wireless device 602 may be configured to select a subset of the plurality of configurations, or the positioning target wireless device 602 may be configured to collect and report each of the plurality of configurations. In some aspects, the positioning network entity 606 may transmit a set of signals to the positioning target wireless device 602 to tune/update a configuration of the plurality of configurations. In some aspects, the positioning network entity 606 may transmit a set of signals to the positioning target wireless device 602 to activate/deactivate a configuration of the plurality of configurations.

The positioning network entity 606 may transmit a set of positioning configurations 614 to the positioning target wireless device 602. The positioning target wireless device 602 may receive the set of positioning configurations 614. The set of positioning configurations 614 may include an indicator of a set of BWPs corresponding with the set of positioning signals 618, a number of positioning signal resources corresponding with the set of positioning signals 618, a number of TRPs transmitting the set of positioning signals 618, a number of PFLs corresponding with the set of positioning signals 618, a set of positioning signal muting masks corresponding with the set of positioning signals 618, and/or a set of processing gap conditions corresponding with the set of positioning signals 618. The set of positioning configurations 614 may indicate to the positioning target wireless device 602 a schedule for the set of positioning signals 618 to be received by the positioning target wireless device 602.

At 616, the positioning target wireless device 602 may apply the set of data collection configurations 612 and the set of positioning configurations 614. The set of positioning neighbor wireless devices 604 may transmit the set of positioning signals 618 to the positioning target wireless device 602. In some aspects, the positioning network entity 606 may configure the transmission of the set of positioning signals 618 by the set of positioning neighbor wireless devices 604.

At 620, the positioning target wireless device 602 may measure the set of positioning signals 618 based on the set of positioning configurations 614. The positioning target wireless device 602 may measure the set of positioning signals 618 based on the set of data collection configurations

612. The positioning target wireless device 602 may select a subset of the measurements measured at 620 to output based on the set of data collection configurations 612.

In some aspects, the positioning target wireless device 602 may transmit a set of measurement reports 622 to the positioning network entity 606. The positioning network entity 606 may receive the set of measurement reports 622 from the positioning target wireless device 602. At 624, the positioning network entity 606 may calculate a set of labels based at least on some of the set of measurement reports 622. The positioning network entity 606 may calculate the set of labels based on additional measurements received from other devices, for example the positioning target wireless device 602 or other UEs. The positioning network entity 606 may transmit a set of labels 626 to the positioning target wireless device 602. The positioning target wireless device 602 may receive the set of labels 626 from the positioning network entity 606.

At 628, the positioning target wireless device 602 may calculate a set of labels. The calculated set of labels may be based on the measurements collected at 620. The calculated set of labels may be based on a subset of the measurements collected at 620 based on the set of data collection configurations 612. The calculated set of labels may be based on a subset of the set of labels 626 received from the positioning network entity 606. At 630, the positioning target wireless device 602 may output a subset of the measurements taken at 620 and/or the labels (a) calculated at 628 and/or (b) received from the positioning network entity 606 as the set of labels 626. The positioning target wireless device 602 may train a positioning model at the positioning target wireless device 602 using the subset of measurements and/or the subset of labels. The positioning target wireless device 602 may verify a positioning model at the positioning target wireless device 602 using the subset of measurements and/or the subset of labels. In some aspects, the positioning target wireless device 602 may verify a positioning model via a label-based approach or a label-free approach. For a label-based approach, the positioning target wireless device 602 may use both labels and the subset of the measurements collected at 620 to verify whether the positioning model outputs a calculated location, position, or intermediate measurement within a degree of accuracy to a label (i.e., verifying the accuracy of the positioning model). For a label-free approach, the positioning target wireless device 602 may compare the subset of measurements to a distribution of the inputs used to train the positioning model (i.e., verifying that the inputs are within a degree of tolerance to the training data of the positioning model). In another aspect, the positioning target wireless device 602 may compare the subset of measurements to statistics (e.g., mean, median) of the inputs used to train the positioning model (i.e., verifying that the inputs are within a degree of tolerance to the training data of the positioning model). In another aspect, the positioning target wireless device 602 may check the consistency of the output of the positioning model over time to determine if the values diverge greatly from previous outputs using similar inputs (i.e., verifying an output consistency of the positioning model). In some aspects, the positioning target wireless device 602 may verify the positioning model before activating the positioning model (e.g., to validate if the positioning model will work as expected). In some aspects, the positioning target wireless device 602 may verify the positioning model after activating the positioning model (e.g., to verify that the positioning model is continuing to work as expected).

The positioning target wireless device 602 may transmit the subset of measurements and/or the subset of labels to a network entity, for example the positioning network entity 606, a training entity, or an OTT server, to train or verify a positioning model that uses the measurements of the positioning target wireless device 602. The network entity that receives the subset of measurements may train or verify the positioning model similarly to the aspects described above.

FIG. 7 is a flowchart 700 of a method of wireless communication. The method may be performed by a UE (e.g., the UE 104, the UE 350; the wireless device 404, the wireless device 504, the positioning target wireless device 602; the apparatus 1304). At 702, the UE may receive a conditional configuration for collecting measurements to at least one of train, or verify a positioning model. For example, 702 may be performed by the positioning target wireless device 602, which may receive the set of data collection configurations 612 from the positioning network entity 606. The set of data collection configurations 612 may include a set of conditions that assist the positioning target wireless device 602 in selecting a subset of positioning signal measurements to at least one of train or verify a positioning model at 630. Moreover, 702 may be performed by the component 198 in FIG. 1, 3, or 13.

At 704, the UE may receive a set of positioning signals. For example, 704 may be performed by the positioning target wireless device 602, which may receive the set of positioning signals 618 from the set of positioning neighbor wireless devices 604. Moreover, 704 may be performed by the component 198 in FIG. 1, 3, or 13.

At 706, the UE may measure the set of positioning signals. For example, 706 may be performed by the positioning target wireless device 602, which may, at 620, measure the set of positioning signals 618. Moreover, 706 may be performed by the component 198 in FIG. 1. 3, or 13.

At 708, the UE may output a subset of the measured set of positioning signals to at least one of train, monitor, or verify the positioning model based on at least one condition of the conditional configuration. For example, 708 may be performed by the positioning target wireless device 602, which may, at 630, output a subset of the measurements collected at 620 based on the configurations 614. The positioning target wireless device 602 may output the subset of measurements to at least one of train or verify the positioning model based on the configuration. Moreover, 708 may be performed by the component 198 in FIG. 1, 3, or 13.

At 710, the UE may output the subset of the measured set of positioning signals by training the positioning model at the UE based on the subset of the measured set of positioning signals. For example, 710 may be performed by the positioning target wireless device 602, which may, at 630, train the positioning model at the positioning target wireless device 602 based on the subset of the measurements collected at 620. The subset may be based on a set of conditions indicated in the set of data collection configurations 612. Moreover, 710 may be performed by the component 198 in FIG. 1.3, or 13.

At 712, the UE may output the subset of the measured set of positioning signals by verifying the positioning model at the UE based on the subset of the measured set of positioning signals. For example, 712 may be performed by the positioning target wireless device 602, which may, at 630, verify the positioning model (e.g., an accuracy, an input tolerance, an output consistency, a predictability) at the positioning target wireless device 602 based on the subset of the measurements collected at 620. The subset may be based on a set of conditions indicated in the set of data collection configurations 612. Moreover, 712 may be performed by the component 198 in FIG. 1, 3, or 13.

At 714, the UE may output the subset of the measured set of positioning signals by transmitting the subset of the measured set of positioning signals to a network entity to at least one of train or verify the positioning model. For example, 714 may be performed by the positioning target wireless device 602, which may, at 630, transmit the subset of the measurements collected at 620 to a network entity (e.g., the positioning network entity 606, a training entity) to at least one of train or verify the positioning model. The subset may be based on a set of conditions indicated in the set of data collection configurations 612. Moreover, 714 may be performed by the component 198 in FIG. 1, 3, or 13.

Figure 8:
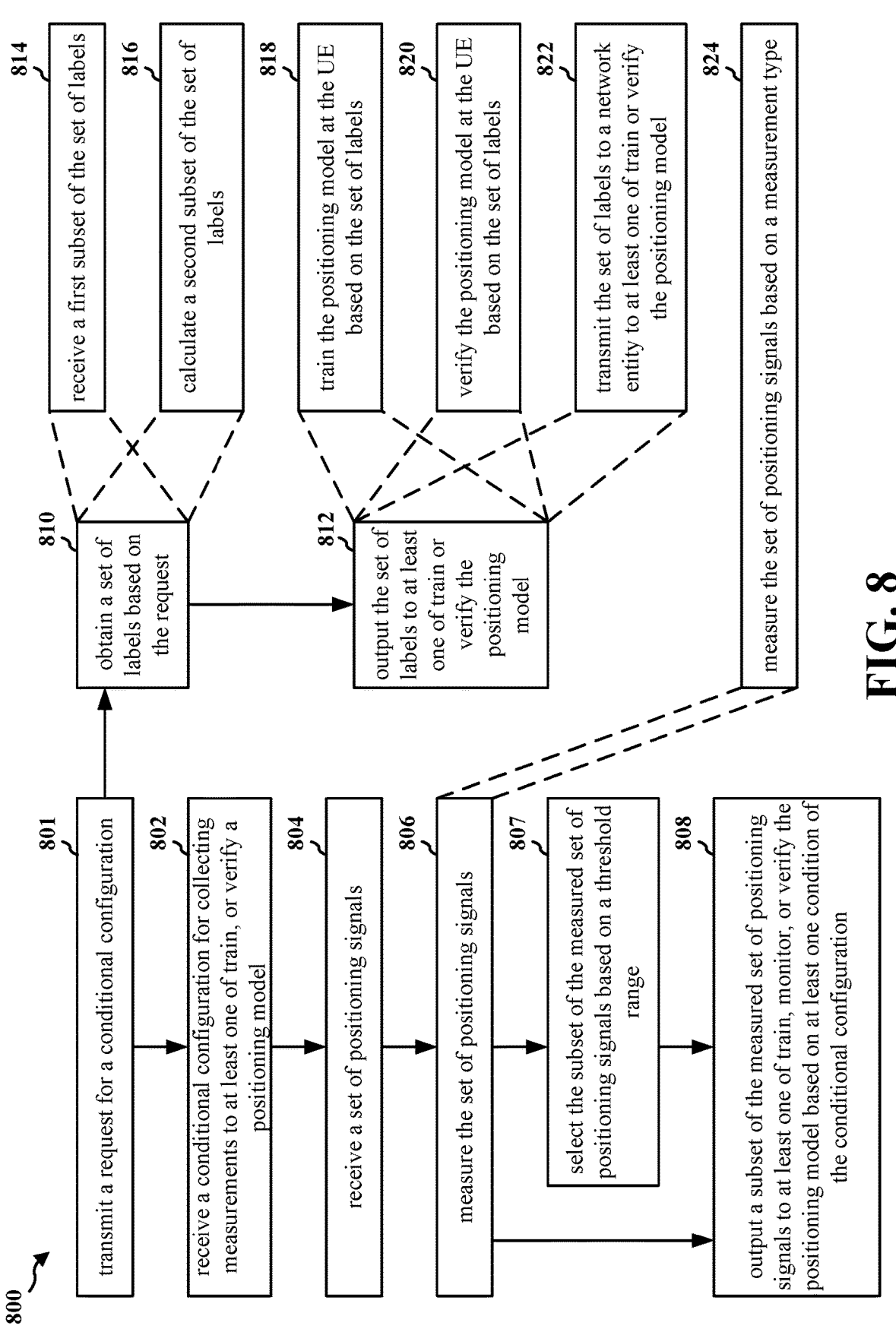
FIG. 8 is a flowchart of a method of wireless communication.

FIG. 8 is a flowchart 800 of a method of wireless communication. The method may be performed by a UE (e.g., the UE 104, the UE 350; the wireless device 404, the wireless device 504, the positioning target wireless device 602; the apparatus 1304).

At 801, the UE may transmit a request for a conditional configuration. For example, 801 may be performed by the positioning target wireless device 602, which may transmit the configuration request 608 to the positioning network entity 606. The configuration request 608 may include a request for a conditional configuration from the positioning network entity 606. Moreover, 801 may be performed by the component 198 in FIG. 1, 3, or 13.

At 802, the UE may receive a conditional configuration for collecting measurements to at least one of train, or verify a positioning model. For example, 802 may be performed by the positioning target wireless device 602, which may receive the set of data collection configurations 612 from the positioning network entity 606. The set of data collection configurations 612 may include a set of conditions that assist the positioning target wireless device 602 in selecting a subset of positioning signal measurements to at least one of train or verify a positioning model at 630. Moreover, 802 may be performed by the component 198 in FIG. 1, 3, or 13.

At 804, the UE may receive a set of positioning signals. For example, 804 may be performed by the positioning target wireless device 602, which may receive the set of positioning signals 618 from the set of positioning neighbor wireless devices 604. Moreover, 804 may be performed by the component 198 in FIG. 1, 3, or 13.

At 806, the UE may measure the set of positioning signals. For example, 806 may be performed by the positioning target wireless device 602, which may, at 620, measure the set of positioning signals 618. Moreover, 806 may be performed by the component 198 in FIG. 1, 3, or 13.

At 807, the UE may select the subset of the measured set of positioning signals based on a threshold range. For example, 807 may be performed by the positioning target wireless device 602, which may select the subset of the measurements at 620 based on a threshold range indicated by the set of data collection configurations 612. Moreover, 807 may be performed by the component 198 in FIG. 1, 3, or 13.

At 808, the UE may output a subset of the measured set of positioning signals to at least one of train, monitor, or verify the positioning model based on at least one condition of the conditional configuration. For example, 808 may be performed by the positioning target wireless device 602, which may, at 630, output a subset of the measurements collected at 620 based on the configurations 614. The positioning target wireless device 602 may, at 630, output the subset of the measurements collected at 620 to at least one of train or verify the positioning model based on the configuration. Moreover, 808 may be performed by the component 198 in FIG. 1, 3, or 13.

At 810, the UE may obtain a set of labels based on the request. For example, 810 may be performed by the positioning target wireless device 602, which may obtain a set of labels based on the request. For example, the positioning target wireless device 602 may receive the set of labels 626 from the positioning network entity 606 based on the request. In another aspect, the positioning target wireless device 602 may calculate a set of labels at 628. Moreover, 810 may be performed by the component 198 in FIG. 1, 3, or 13.

At 812, the UE may output the set of labels to at least one of train or verify the positioning model. For example, 812 may be performed by the positioning target wireless device 602, which may, at 630, output the set of labels to at least one of train or verify the positioning model. Moreover, 812 may be performed by the component 198 in FIG. 1, 3, or 13.

At 814, the UE may obtain a set of labels based on the request by receiving a first subset of the set of labels. For example, 814 may be performed by the positioning target wireless device 602, which may receive the set of labels 626 from the positioning network entity 606 as the first subset of the set of labels. Moreover, 814 may be performed by the component 198 in FIG. 1, 3, or 13.

At 816, the UE may obtain a set of labels based on the request by calculating a second subset of the set of labels. For example, 816 may be performed by the positioning target wireless device 602, which may, at 628, calculate a second subset of the set of labels. Moreover, 816 may be performed by the component 198 in FIG. 1, 3, or 13.

At 818, the UE may output the set of labels to at least one of train or verify the positioning model by training the positioning model at the UE based on the set of labels. For example, 818 may be performed by the positioning target wireless device 602, which may, at 630, train the positioning model at the positioning target wireless device 602 based on the set of labels. Moreover, 818 may be performed by the component 198 in FIG. 1, 3, or 13.

At 820, the UE may output the set of labels to at least one of train or verify the positioning model by verifying the positioning model at the UE based on the set of labels. For example, 820 may be performed by the positioning target wireless device 602, which may, at 630, verify the positioning model at the positioning target wireless device 602 based on the set of labels. Moreover, 820 may be performed by the component 198 in FIG. 1, 3, or 13.

At 822, the UE may output the set of labels to at least one of train or verify the positioning model by transmitting the set of labels to a network entity to at least one of train or verify the positioning model. For example, 822 may be performed by the positioning target wireless device 602, which may, at 630, transmit the set of labels to a network entity (e.g., the positioning network entity 606 or an OTT server) to at least one of train or verify the positioning model. Moreover, 822 may be performed by the component 198 in FIG. 1, 3, or 13.

At 824, the UE may measure the set of positioning signals by measuring the set of positioning signals based on a measurement type. For example, 824 may be performed by the positioning target wireless device 602, which may, at 620, measure the set of positioning signals based on a measurement type indicated by the set of data collection configurations 612. Moreover, 824 may be performed by the component 198 in FIG. 1, 3, or 13.

FIG. 9 is a flowchart 900 of a method of wireless communication. The method may be performed by a UE (e.g., the UE 104, the UE 350; the wireless device 404, the wireless device 504, the positioning target wireless device 602; the apparatus 1304).

At 902, the UE may receive a second conditional configuration to obtain a set of labels. For example, 902 may be performed by the positioning target wireless device 602, which may receive the set of data collection configurations 612 from the positioning network entity 606. The set of data collection configurations 612 may include a second conditional configuration to obtain a set of labels. Moreover, 902 may be performed by the component 198 in FIG. 1, 3, or 13.

At 904, the UE may obtain the set of labels based on at least one second condition of the second conditional configuration. For example, 904 may be performed by the positioning target wireless device 602, which may obtain the set of labels based on at least one second condition of the second conditional configuration indicated by the set of data collection configurations 612. For example, the positioning target wireless device 602 may receive the set of labels 626 from the positioning network entity 606. In another example, the positioning target wireless device 602 may, at 628, calculate a set of labels based on the measurements collected at 620//. Moreover, 904 may be performed by the component 198 in FIG. 1, 3, or 13.

At 906, the UE may output the set of labels to at least one of train or verify the positioning model based on the second conditional configuration. For example, 906 may be performed by the positioning target wireless device 602, which may, at 630, output the set of labels to at least one of train or verify the positioning model based on the second conditional configuration indicated by the set of data collection configurations 612. Moreover, 906 may be performed by the component 198 in FIG. 1, 3, or 13.

At 908, the UE may obtain the set of labels by receiving a first subset of the set of labels. For example, 908 may be performed by the positioning target wireless device 602, which may receive the set of labels 626 from the positioning network entity 606. The set of labels 626 may be a first subset of the set of labels. Moreover, 908 may be performed by the component 198 in FIG. 1, 3, or 13.

At 910, the UE may obtain the set of labels by calculating a second subset of the set of labels. For example, 910 may be performed by the positioning target wireless device 602, which may, at 628, calculate a second subset of the set of labels. Moreover, 910 may be performed by the component 198 in FIG. 1, 3, or 13.

At 912, the UE may output the set of labels by training the positioning model at the UE based on the set of labels. For example, 912 may be performed by the positioning target wireless device 602, which may, at 630, train the positioning model at the positioning target wireless device 602 based on the set of labels. Moreover, 912 may be performed by the component 198 in FIG. 1, 3, or 13.

At 914, the UE may output the set of labels by verifying the positioning model at the UE based on the set of labels. For example, 914 may be performed by the positioning target wireless device 602, which may, at 630, verify the positioning model at the positioning target wireless device 602 based on the set of labels. Moreover, 914 may be performed by the component 198 in FIG. 1, 3, or 13.

At 916, the UE may output the set of labels by transmitting the set of labels to a network entity to at least one of train or verify the positioning model. For example, 916 may be performed by the positioning target wireless device 602, which may, at 630, transmit the set of labels to a network entity (e.g., the positioning network entity 606 or a training entity) to at least one of train or verify the positioning model. Moreover, 916 may be performed by the component 198 in FIG. 1, 3, or 13.

At 918, the UE may output the set of labels by outputting a known location of the UE as a label to at least one of train or verify the positioning model. For example, 918 may be performed by the positioning target wireless device 602, which may, at 630, output a known location of the positioning target wireless device 602 (e.g., if the UE is a PRU with a known location) as a label to at least one of train or verify the positioning model. Moreover, 918 may be performed by the component 198 in FIG. 1, 3, or 13.

FIG. 10 is a flowchart 1000 of a method of wireless communication. The method may be performed by a network entity (e.g., the base station 102, the base station 310; the core network 120; the one or more location servers 168; the LMF 166; the wireless device 402, the wireless device 406, the wireless device 502, the wireless device 506; the positioning network entity 606; the network entity 1302, the network entity 1402, the network entity 1560). At 1002, the network entity may configure a conditional configuration for a selection of a subset of measurements of a set of positioning signals to at least one of train or verify a positioning model. For example, 1002 may be performed by the positioning network entity 606 in FIG. 6, which may, at 610, configure a conditional configuration for a selection of a subset of measurements of the set of positioning signals 618 to at least one of train or verify a positioning model. Moreover, 1002 may be performed by the component 199 in FIG. 1, 3, 14, or 15.

At 1004, the network entity may transmit the conditional configuration to at least one of train or verify the positioning model. For example, 1004 may be performed by the positioning network entity 606 in FIG. 6, which may transmit the set of data collection configurations 612 to the positioning target wireless device 602. The set of data collection configurations 612 may include a conditional configuration for selecting a subset of measurements of the set of positioning signals 618 to at least one of train or verify the positioning model. Moreover, 1004 may be performed by the component 199 in FIG. 1, 3, 14, or 15.

Figure 11:
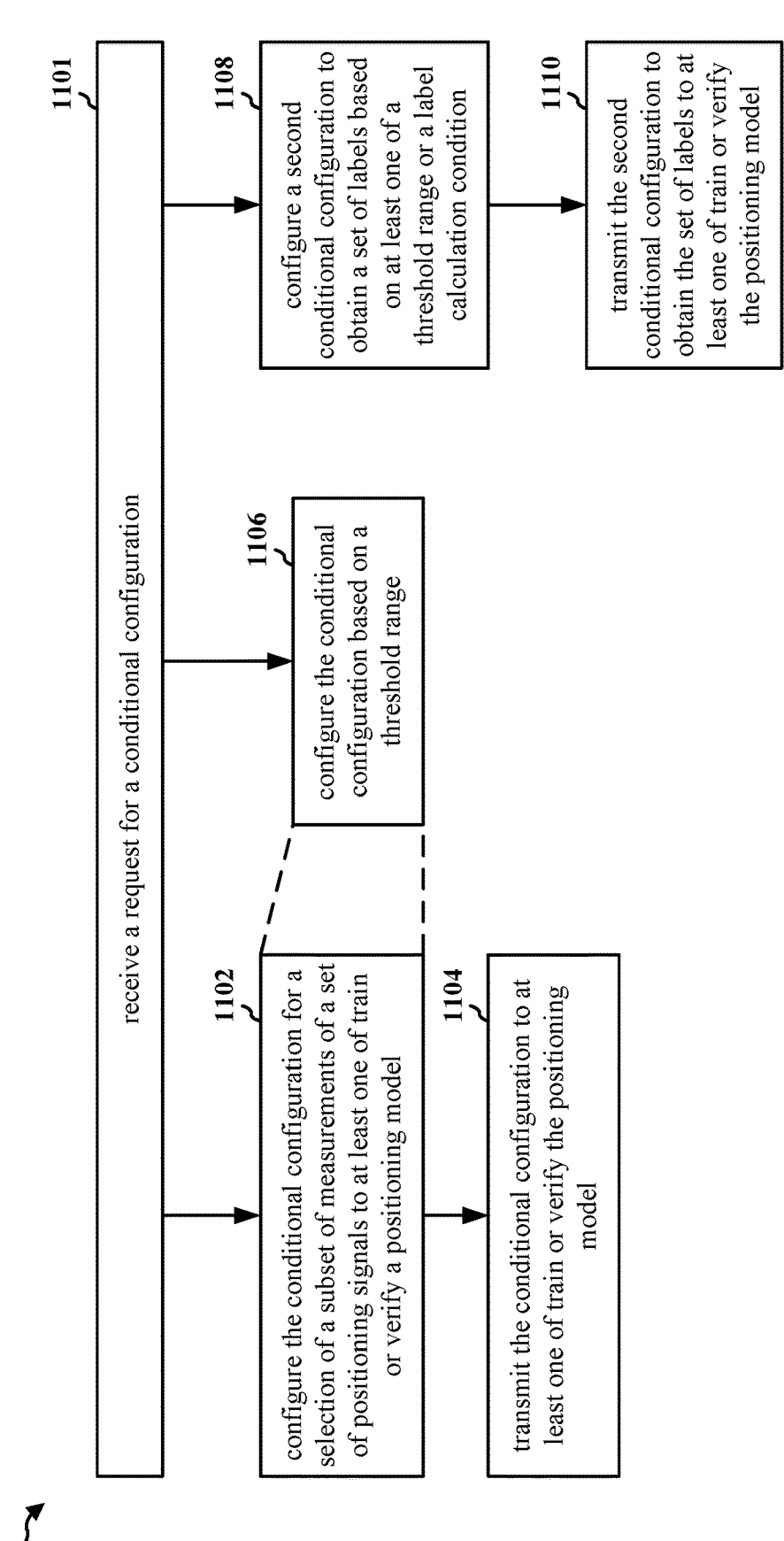
FIG. 11 is a flowchart of a method of wireless communication.

FIG. 11 is a flowchart 1100 of a method of wireless communication. The method may be performed by a network entity (e.g., the base station 102, the base station 310; the core network 120; the one or more location servers 168; the LMF 166; the wireless device 402, the wireless device 406, the wireless device 502, the wireless device 506; the positioning network entity 606; the network entity 1302, the network entity 1402, the network entity 1560).

At 1101, the network entity may receive a request for a conditional configuration. For example, 1101 may be performed by the positioning network entity 606 in FIG. 6, which may receive the configuration request 608 from the positioning target wireless device 602. The configuration request 608 may include a request for a conditional configuration from the positioning network entity 606. Moreover, 1101 may be performed by the component 199 in FIG. 1, 3, 14, or 15.

At 1102, the network entity may configure the conditional configuration for a selection of a subset of measurements of a set of positioning signals to at least one of train or verify a positioning model. For example, 1102 may be performed by the positioning network entity 606 in FIG. 6, which may, at 610, configure the conditional configuration for a selection of a subset of measurements of the set of positioning signals 618 to at least one of train or verify a positioning model. Moreover, 1102 may be performed by the component 199 in FIG. 1, 3, 14, or 15.

At 1104, the network entity may transmit the conditional configuration to at least one of train or verify the positioning model. For example, 1104 may be performed by the positioning network entity 606 in FIG. 6, which may transmit the set of data collection configurations 612 to the positioning target wireless device 602. The set of data collection configurations 612 may include a conditional configuration for selecting a subset of measurements of the set of positioning signals 618 to at least one of train or verify the positioning model. Moreover, 1104 may be performed by the component 199 in FIG. 1, 3, 14, or 15.

At 1106, the network entity may configure the conditional configuration by configuring the conditional configuration based on a threshold range. For example, 1106 may be performed by the positioning network entity 606 in FIG. 6, which may, at 610, configure the conditional configuration based on a threshold range. Moreover, 1106 may be performed by the component 199 in FIG. 1, 3, 14, or 15.

At 1108, the network entity may configure a second conditional configuration to obtain a set of labels based on at least one of a threshold range or a label calculation condition. For example, 1108 may be performed by the positioning network entity 606 in FIG. 6, which may, at 610, configure a second conditional configuration to obtain a set of labels based on at least one of a threshold range or a label calculation condition. Moreover, 1108 may be performed by the component 199 in FIG. 1, 3. 14, or 15.

At 1110, the network entity may transmit the second conditional configuration to obtain the set of labels to at least one of train or verify the positioning model. For example, 1110 may be performed by the positioning network entity 606 in FIG. 6, which may transmit the set of data collection configurations 612 to the positioning target wireless device 602. The set of data collection configurations 612 may include the second conditional configuration to obtain the set of labels to at least one of train or verify the positioning model. Moreover, 1110 may be performed by the component 199 in FIG. 1, 3, 14, or 15.

FIG. 12 is a flowchart 1200 of a method of wireless communication. The method may be performed by a network entity (e.g., the base station 102, the base station 310; the core network 120; the one or more location servers 168; the LMF 166; the wireless device 402, the wireless device 406, the wireless device 502, the wireless device 506; the positioning network entity 606; the network entity 1302, the network entity 1402, the network entity 1560).

At 1202, the network entity may configure a second conditional configuration to obtain a set of labels to at least one of train or verify the positioning model. For example, 1202 may be performed by the positioning network entity 606 in FIG. 6, which may, at 610, configure a second conditional configuration to obtain a set of labels to at least one of train or verify the positioning model. Moreover, 1202 may be performed by the component 199 in FIG. 1, 3, 14, or 15.

At 1204, the network entity may transmit the conditional configuration to at least one of train or verify the positioning model. For example, 1204 may be performed by the positioning network entity 606 in FIG. 6, which may transmit the set of data collection configurations 612 to the positioning target wireless device 602. The set of data collection configurations 612 may include the conditional configuration to at least one of train or verify the positioning model. In some aspects, the positioning network entity 606 may transmit configurations to other wireless devices, for example the set of positioning neighbor wireless devices 604, or other UEs/PRUs about the positioning target wireless device 602, which may be configured to collect/calculate and report labels to the positioning network entity 606. Moreover, 1204 may be performed by the component 199 in FIG. 1, 3, 14, or 15.

At 1206, the network entity may receive a set of measurements of a second set of positioning signals. For example, 1206 may be performed by the positioning network entity 606 in FIG. 6, which may receive the set of measurement reports 622 from the positioning target wireless device 602. The set of measurement reports 622 may include a set of measurements of the set of positioning signals 618. In some aspects, the positioning network entity 606 may receive measurements from other devices, for example the set of positioning neighbor wireless devices 604 or other UEs/PRUs in a shared area of the positioning target wireless device 602. Moreover, 1206 may be performed by the component 199 in FIG. 1, 3, 14, or 15.

At 1208, the network entity may calculate a subset of the set of labels based on the set of measurements. For example, 1208 may be performed by the positioning network entity 606 in FIG. 6, which may, at 624, calculate a subset of the set of labels based on the set of measurement reports 622 and/or measurements received from other devices. Moreover, 1208 may be performed by the component 199 in FIG. 1, 3, 14, or 15.

At 1210, the network entity may transmit the subset of the set of labels based on at least one second condition of the second conditional configuration. For example, 1210 may be performed by the positioning network entity 606 in FIG. 6, which may transmit the set of labels 626 to the positioning target wireless device 602. The set of labels 626 may include a subset of the set of labels. The transmission of the set of labels 626 may be based on at least one second condition of the second conditional configuration. Moreover, 1210 may be performed by the component 199 in FIG. 1, 3, 14, or 15.

At 1212, the network entity may receive a subset of the set of labels. For example, 1212 may be performed by the positioning network entity 606 in FIG. 6, which may receive a subset of the set of labels from other devices, for example the set of positioning neighbor wireless devices 604 or other UEs/PRUs bout the positioning target wireless device 602. In other words, the positioning network entity 606 may aggregate labels from a plurality of wireless devices. Moreover, 1212 may be performed by the component 199 in FIG. 1, 3, 14, or 15.

At 1214, the network entity may transmit the subset of the set of labels based on at least one second condition of the second conditional configuration. For example, 1214 may be performed by the positioning network entity 606 in FIG. 6, which may transmit set of labels 626 to the positioning target wireless device 602. The transmission of the set of labels 626 may be based on at least one second condition of the second conditional configuration. Moreover, 1214 may be performed by the component 199 in FIG. 1, 3, 14, or 15.

Figure 13:
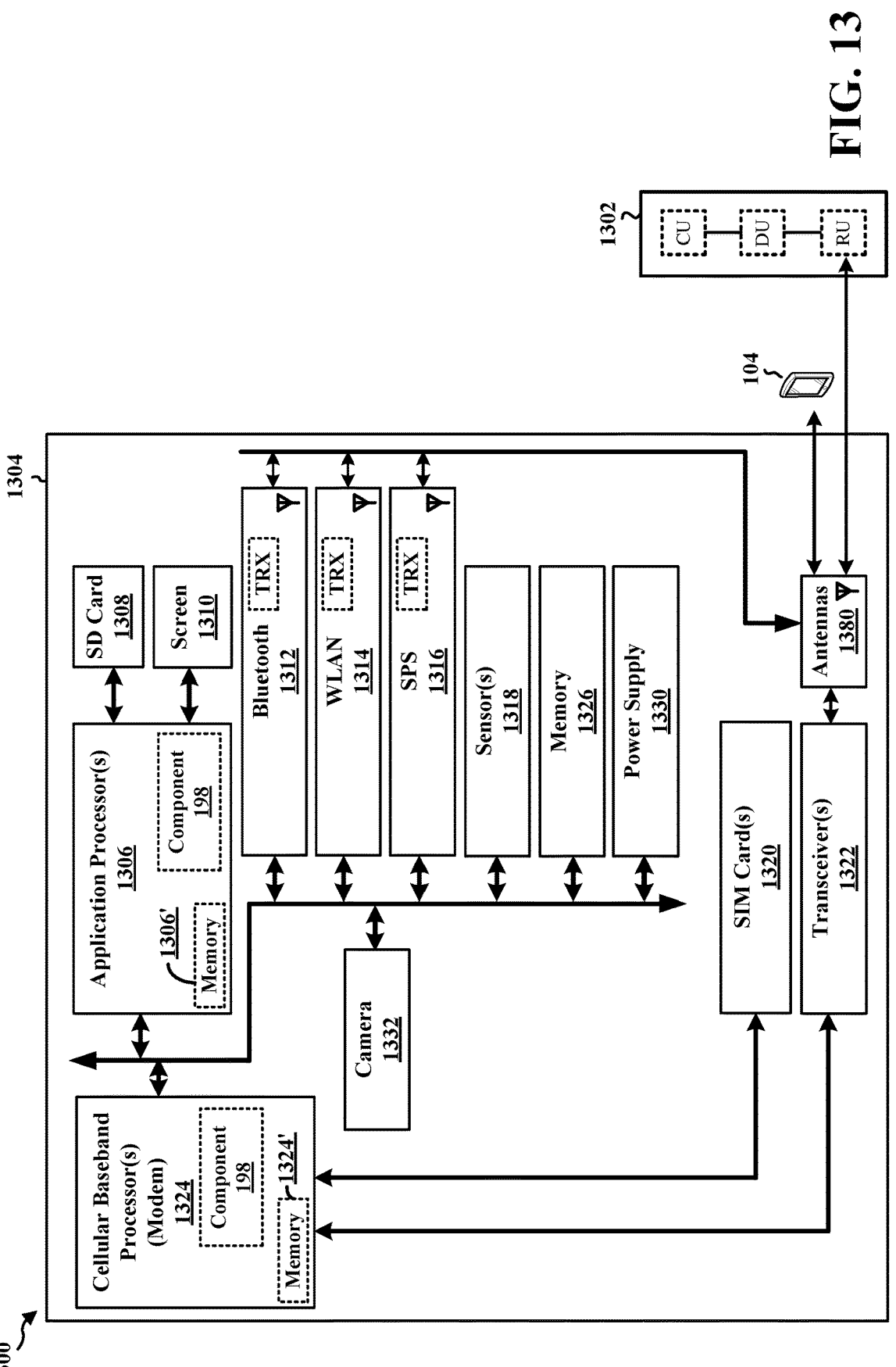
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the component 198 may be configured to receive a conditional configuration for collecting measurements to at least one of train or verify a positioning model. The component 198 may be configured to receive a set of positioning signals. The component 198 may be configured to measure the set of positioning signals. The component 198 may be configured to output a subset of the measured set of positioning signals to at least one of train or verify the positioning model based on the conditional configuration. The component 198 may be configured to output the subset of the measured set of positioning signals by training the positioning model at the apparatus 1304 based on the subset of the measured set of positioning signals. The component 198 may be configured to output the subset of the measured set of positioning signals by verifying the positioning model at the apparatus 1304 based on the subset of the measured set of positioning signals. The component 198 may be configured to output the subset of the measured set of positioning signals by transmitting the subset of the measured set of positioning signals to a network entity to at least one of train or verify the positioning model. The component 198 may be within the cellular baseband processor(s) 1324, the application processor(s) 1306, or both the cellular baseband processor(s) 1324 and the application processor(s) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for receiving a conditional configuration for collecting measurements to at least one of train or verify a positioning model. The apparatus 1304 may include means for receiving a set of positioning signals; measuring the set of positioning signals. The apparatus 1304 may include means for outputting a subset of the measured set of positioning signals to at least one of train or verify the positioning model based on at least one condition of the conditional configuration. The conditional configuration may include an indicator of a set of conditions. The set of conditions may include a threshold range. The apparatus 1304 may include means for selecting the subset of the measured set of positioning signals based on the threshold range. The threshold range may include at least one of (a) an RSRP threshold range, (b) a SNR threshold range, (c) a SINR threshold range, (d) a delay spread threshold range, (c) a Rician factor threshold range, (f) a Doppler spread threshold range or (g) a multipath component threshold range. The conditional configuration may include an indicator of a set of conditions. The set of conditions may include a measurement type. The apparatus 1304 may include means for measuring the set of positioning signals by measuring the set of positioning signals based on the measurement type. The measurement type may include at least one of (a) an RSTD. (b) an RSRP. (c) an RSRPP, (d) a timing measurement associated with a path, (c) a CIR timing measurement, (F) a CIR power measurement, (g) a CIR phase measurement, (h) a CFR frequency measurement, (i) a CFR power measurement, (j) or a CFR phase measurement. The apparatus 1304 may include means for receiving a second conditional configuration to obtain a set of labels. The apparatus 1304 may include means for obtaining the set of labels based on at least one second condition of the second conditional configuration. The apparatus 1304 may include means for outputting the set of labels to at least one of train or verify the positioning model based on the second conditional configuration. The second configuration may include a second set of conditions. The second set of conditions may include at least one of (a) a first threshold range associated with a second subset of the measured set of positioning signals used to calculate a location of the apparatus 1304, (b) a second threshold range associated with a label error rate associated with a calculation method used to calculate the location of the apparatus 1304, (c) a first indicator of a set of calculation methods used to calculate the location of the apparatus 1304, (d) a second indicator of a statistical representation method used to summarize a set of calculated locations of the apparatus 1304 or (e) a third indicator of a set of label quality standards associated with the set of labels. The apparatus 1304 may include means for outputting the set of labels by at least one of: training the positioning model at the appa-ratus 1304 based on the set of labels. The apparatus 1304 may include means for outputting the set of labels by verifying the positioning model at the apparatus 1304 based on the set of labels. The apparatus 1304 may include means for outputting the set of labels by transmitting the set of labels to a network entity to at least one of train or verify the positioning model. The apparatus 1304 may include means for obtaining the set of labels by receiving a first subset of the set of labels. The apparatus 1304 may include means for transmitting a request for the conditional configuration before the reception of the conditional configuration. The apparatus 1304 may include means for obtaining the set of labels by calculating a second subset of the set of labels. The request may include an indicator of a threshold range. The apparatus 1304 may include means for selecting the subset of the measured set of positioning signals based on the threshold range. The request may include at least one of a first indicator of a threshold range associated with a calcu-lation of a set of labels or a second indicator of a label calculation condition associated with the calculation of the set of labels. The apparatus 1304 may include means for obtaining the set of labels based on the request. The appa-ratus 1304 may include means for outputting the set of labels to at least one of train or verify the positioning model. The apparatus 1304 may include means for obtaining the set of labels based on the request by receiving a first subset of the set of labels. The apparatus 1304 may include means for obtaining the set of labels based on the request by calculat-ing a second subset of the set of labels. The request may include at least one of (a) a second threshold range associ-ated with a set of measured positioning signals used to calculate a location of the apparatus 1304, (b) a third threshold range associated with a label error rate associated with a calculation method used to calculate the location of the apparatus 1304, (c) a third indicator of a set of calcula-tion methods used to calculate the location of the apparatus 1304, (d) a fourth indicator of a statistical representation method used to summarize a set of calculated locations of the apparatus 1304 or (e) a fifth indicator of a set of label quality standards associated with the set of labels. The apparatus 1304 may include means for outputting the subset of the measured set of positioning signals by training the positioning model at the apparatus 1304 based on the subset of the measured set of positioning signals. The apparatus 1304 may include means for outputting the subset of the measured set of positioning signals by verifying the posi-tioning model at the apparatus 1304 based on the subset of the measured set of positioning signals. The apparatus 1304 may include means for outputting the subset of the measured set of positioning signals by transmitting the subset of the measured set of positioning signals to a network entity to at least one of train or verify the positioning model. The apparatus 1304 may include a PRU having a known loca-tion. The apparatus 1304 may include means for outputting the known location as a label to at least one of train or verify the positioning model. The means may be the component 198 of the apparatus 1304 configured to perform the func-tions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 con-figured to perform the functions recited by the means.

Figure 14:
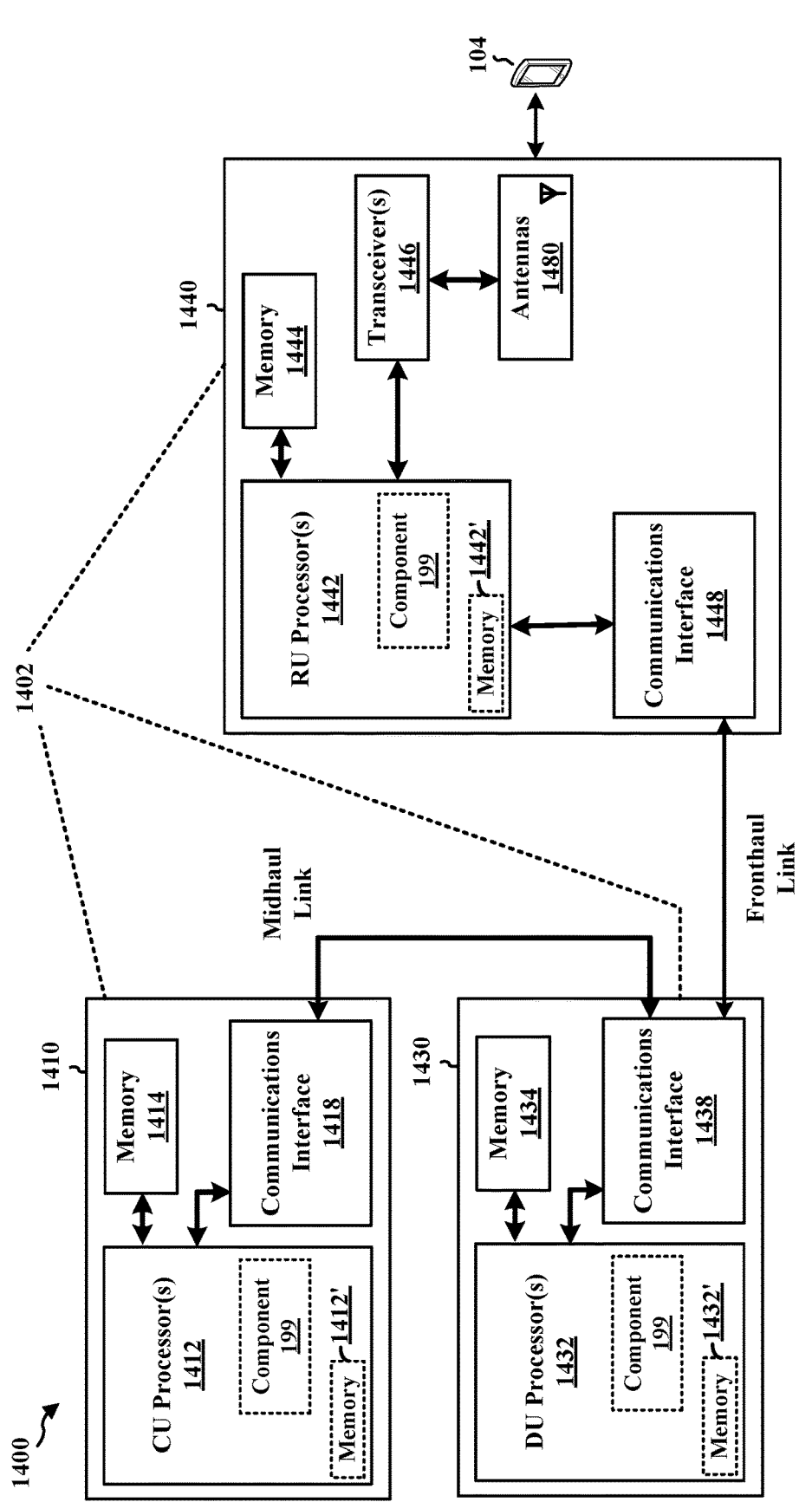
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communi-cations interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, antennas 1480, and a com-munications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-tran-sitory. Each of the processors 1412, 1432, 1442 is respon-sible for general processing, including the execution of software stored on the computer-readable medium/memory. The software, when executed by the corresponding proces-sor(s) causes the processor(s) to perform the various func-tions described supra. The computer-readable medium/memory may also be used for storing data that is manipulated by the processor(s) when executing software.

As discussed supra, the component 199 may be config-ured to configure a conditional configuration for a selection of a subset of measurements of a set of positioning signals to at least one of train or verify a positioning model. The component 199 may be configured to transmit the condi-tional configuration to at least one of train or verify the positioning model. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some com-bination thereof. When multiple processors are imple-mented, the multiple processors may perform the stated processes/algorithm individually or in combination. The network entity 1402 may include a variety of components configured for various functions. In one configuration, the network entity 1402 may include means for configuring a conditional configuration for a selection of a subset of measurements of a set of positioning signals to at least one of train or verify a positioning model. The network entity 1402 may include means for transmitting the conditional configuration to at least one of train or verify the positioning model. The conditional configuration may include an indicator of a set of conditions. The set of conditions may include a threshold range. The apparatus 1304 may include means for selecting the subset of the measured set of positioning signals based on the threshold range. The threshold range may include at least one of (a) an RSRP threshold range, (b) a SNR threshold range, (c) a SINR threshold range, (d) a delay spread threshold range, (e) a Rician factor threshold range, (f) a Doppler spread threshold range or (g) a multipath component threshold range. The conditional configuration may include an indicator of a set of conditions. The set of conditions may include a measurement type. The apparatus 1304 may include means for measuring the set of positioning signals by measuring the set of positioning signals based on the measurement type. The measurement type may include at least one of (a) an RSTD, (b) an RSRP, (c) an RSRPP, (d) a timing measurement associated with a path, (c) a CIR timing measurement, (F) a CIR power measurement, (g) a CIR phase measurement, (h) a CFR frequency measurement, (i) a CFR power measurement, (j) or a CFR phase measurement. The network entity 1402 may include means for configuring a second conditional configuration to obtain a set of labels to at least one of train or verify the positioning model. The network entity 1402 may include means for transmitting the second conditional configuration to obtain the set of labels to at least one of train or verify the positioning model. The second conditional configuration may include a set of conditions. The set of conditions may include at least one of (a) a first threshold range for a second selection of a second subset of the measurements of the set of positioning signals for a calculation of a location of a UE (e.g., the UE 104), (b) a second threshold range for a label error rate associated with the calculation of the location of the UE, (c) a first indicator of a set of calculation methods for the calculation of the location of the UE, (d) a second indicator of a statistical representation method for the calculation of the location of the UE or (e) a third indicator of a set of label quality standards for the calculation of the location of the UE. The network entity 1402 may include means for receiving a subset of the set of labels. The network entity 1402 may include means for training the positioning model at the network entity 1402 based on the set of labels. The network entity 1402 may include means for verifying the positioning model at the network entity 1402 based on the set of labels. The network entity 1402 may include means for receiving a set of measurements of a second set of positioning signals. The network entity 1402 may include means for calculating a subset of the set of labels based on the set of measurements. The network entity 1402 may include means for transmitting the subset of the set of labels based on the second conditional configuration. The network entity 1402 may include means for receiving a request for the conditional configuration. The transmission of the conditional configuration may be based on the request. The request may include an indicator of a threshold range. The network entity 1402 may include means for configuring the conditional configuration for the selection of the subset of measurements of the set of positioning signals to at least one of train or verify the positioning model by configuring the conditional configuration based on the threshold range. The request may include at least one of a first indicator of a threshold range associated with a calculation of a set of labels or a second indicator of a label calculation condition associated with the calculation of the set of labels. The network entity 1402 may include means for configuring a second conditional configuration to obtain the set of labels based on at least one of the threshold range or the label calculation condition. The network entity 1402 may include means for transmitting the second conditional configuration to obtain the set of labels to at least one of train or verify the positioning model. The network entity 1402 may include means for receiving a subset of the set of labels. The network entity 1402 may include means for training the positioning model at the network entity 1402 based on the set of labels. The network entity 1402 may include means for verifying the positioning model at the network entity 1402 based on the set of labels. The network entity 1402 may include means for receiving a set of measurements of a second set of positioning signals. The network entity 1402 may include means for calculating a subset of the set of labels based on the set of measurements. The network entity 1402 may include means for transmitting the subset of the set of labels based on the second conditional configuration. The request may include at least one of (a) a first threshold range for a second selection of a second subset of the measurements of the set of positioning signals for a calculation of a location of a UE (e.g., the UE 104), (b) a second threshold range for a label error rate associated with the calculation of the location of the UE, (c) a first indicator of a set of calculation methods for the calculation of the location of the UE, (d) a second indicator of a statistical representation method for the calculation of the location of the UE or (e) a third indicator of a set of label quality standards for the calculation of the location of the UE. The network entity 1402 may include means for receiving the subset of measurements of the set of positioning signals. The network entity 1402 may include means for training the positioning model at the network entity 1402 based on the subset of measurements of the set of positioning signals. The network entity 1402 may include means for verifying the positioning model at the network entity 1402 based on the subset of measurements of the set of positioning signals. The network entity 1402 may include an LMF. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
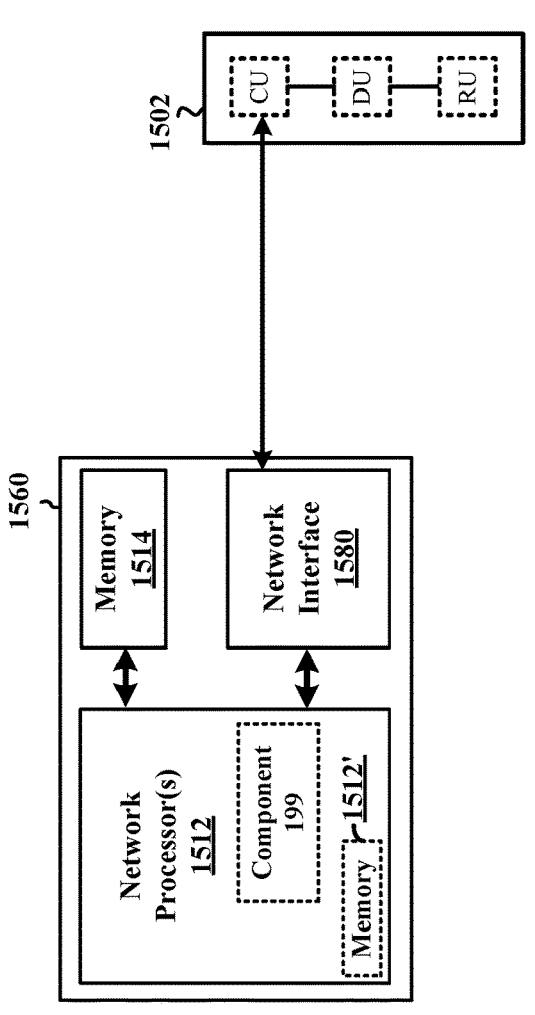
FIG. 15 is a diagram illustrating an example of a hardware implementation for an example network entity.

FIG. 15 is a diagram 1500 illustrating an example of a hardware implementation for a network entity 1560. In one example, the network entity 1560 may be within the core network 120. The network entity 1560 may include at least one network processor 1512. The network processor(s) 1512 may include on-chip memory 1512'. In some aspects, the network entity 1560 may further include additional memory modules 1514. The network entity 1560 communicates via the network interface 1580 directly (e.g., backhaul link) or indirectly (e.g., through a RIC) with the CU 1502. The on-chip memory 1512' and the additional memory modules 1514 may each be considered a computer-readable medium/memory. Each computer-readable medium/memory may be non-transitory. The network processor(s) 1512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to configure a conditional configuration for a selection of a subset of measurements of a set of positioning signals to at least one of train or verify a positioning model. The component 199 may be configured to transmit the conditional configuration to at least one of train or verify the positioning model. The component 199 may be within the network processor(s) 1512. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1560 may include a variety of components configured for various functions. In one configuration, the network entity 1560 may include means for configuring a conditional configuration for a selection of a subset of measurements of a set of positioning signals to at least one of train or verify a positioning model. The network entity 1560 may include means for transmitting the conditional configuration to at least one of train or verify the positioning model. The conditional configuration may include an indicator of a set of conditions. The set of conditions may include a threshold range. The apparatus 1304 may include means for selecting the subset of the measured set of positioning signals based on the threshold range. The threshold range may include at least one of (a) an RSRP threshold range, (b) a SNR threshold range, (c) a SINR threshold range, (d) a delay spread threshold range, (e) a Rician factor threshold range, (f) a Doppler spread threshold range or (g) a multipath component threshold range. The conditional configuration may include an indicator of a set of conditions. The set of conditions may include a measurement type. The apparatus 1304 may include means for measuring the set of positioning signals by measuring the set of positioning signals based on the measurement type. The measurement type may include at least one of (a) an RSTD, (b) an RSRP, (c) an RSRPP, (d) a timing measurement associated with a path, (e) a CIR timing measurement, (F) a CIR power measurement, (g) a CIR phase measurement, (h) a CFR frequency measurement, (i) a CFR power measurement, (j) or a CFR phase measurement. The network entity 1560 may include means for configuring a second conditional configuration to obtain a set of labels to at least one of train or verify the positioning model. The network entity 1560 may include means for transmitting the second conditional configuration to obtain the set of labels to at least one of train or verify the positioning model. The second conditional configuration may include a set of conditions. The set of conditions may include at least one of (a) a first threshold range for a second selection of a second subset of the measurements of the set of positioning signals for a calculation of a location of a UE (e.g., the UE 104), (b) a second threshold range for a label error rate associated with the calculation of the location of the UE, (c) a first indicator of a set of calculation methods for the calculation of the location of the UE, (d) a second indicator of a statistical representation method for the calculation of the location of the UE or (e) a third indicator of a set of label quality standards for the calculation of the location of the UE. The network entity 1560 may include means for receiving a subset of the set of labels. The network entity 1560 may include means for training the positioning model at the network entity 1560 based on the set of labels. The network entity 1560 may include means for verifying the positioning model at the network entity 1560 based on the set of labels. The network entity 1560 may include means for receiving a set of measurements of a second set of positioning signals. The network entity 1560 may include means for calculating a subset of the set of labels based on the set of measurements. The network entity 1560 may include means for transmitting the subset of the set of labels based on the second conditional configuration. The network entity 1560 may include means for receiving a request for the conditional configuration. The transmission of the conditional configuration may be based on the request. The request may include an indicator of a threshold range. The network entity 1560 may include means for configuring the conditional configuration for the selection of the subset of measurements of the set of positioning signals to at least one of train or verify the positioning model by configuring the conditional configuration based on the threshold range. The request may include at least one of a first indicator of a threshold range associated with a calculation of a set of labels or a second indicator of a label calculation condition associated with the calculation of the set of labels. The network entity 1560 may include means for configuring a second conditional configuration to obtain the set of labels based on at least one of the threshold range or the label calculation condition. The network entity 1560 may include means for transmitting the second conditional configuration to obtain the set of labels to at least one of train or verify the positioning model. The network entity 1560 may include means for receiving a subset of the set of labels. The network entity 1560 may include means for training the positioning model at the network entity 1560 based on the set of labels. The network entity 1560 may include means for verifying the positioning model at the network entity 1560 based on the set of labels. The network entity 1560 may include means for receiving a set of measurements of a second set of positioning signals. The network entity 1560 may include means for calculating a subset of the set of labels based on the set of measurements. The network entity 1560 may include means for transmitting the subset of the set of labels based on the second conditional configuration. The request may include at least one of (a) a first threshold range for a second selection of a second subset of the measurements of the set of positioning signals for a calculation of a location of a UE (e.g., the UE 104), (b) a second threshold range for a label error rate associated with the calculation of the location of the UE, (c) a first indicator of a set of calculation methods for the calculation of the location of the UE, (d) a second indicator of a statistical representation method for the calculation of the location of the UE or (e) a third indicator of a set of label quality standards for the calculation of the location of the UE. The network entity 1560 may include means for receiving the subset of measurements of the set of positioning signals. The network entity 1560 may include means for training the positioning model at the network entity 1560 based on the subset of measurements of the set of positioning signals. The network entity 1560 may include means for verifying the positioning model at the network entity 1560 based on the subset of measurements of the set of positioning signals. The network entity 1560 may include an LMF. The means may be the component 199 of the network entity 1560 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A. multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, may send the data to a device that transmits the data, or may send the data to a component of the device. A device configured to "obtain" data, such as a transmission, signal, or message, may receive, for example with a transceiver, may obtain the data from a device that receives the data, or may obtain the data from a component of the device. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving a conditional configuration for collecting measurements to at least one of train or verify a positioning model; receiving a set of positioning signals; measuring the set of positioning signals; and outputting a subset of the measured set of positioning signals to at least one of train or verify the positioning model based on at least one condition of the conditional configuration.

Aspect 2 is the method of aspect 1, wherein the conditional configuration comprises an indicator of a set of conditions, wherein the set of conditions comprises a threshold range, further comprising selecting the subset of the measured set of positioning signals based on the threshold range.

Aspect 3 is the method of aspect 2, wherein the threshold range comprises at least one of: a reference signal received power (RSRP) threshold range; a signal to noise ratio (SNR) threshold range; a signal to interference and noise ratio (SINR) threshold range; a delay spread threshold range; a Rician factor threshold range; a Doppler spread threshold range; or a multipath component threshold range.

Aspect 4 is the method of any of aspects 1 to 3, wherein the conditional configuration comprises an indicator of a set of conditions, wherein the set of conditions comprises a measurement type, wherein measuring the set of positioning signals comprises measuring the set of positioning signals based on the measurement type.

Aspect 5 is the method of aspect 4, wherein the measurement type comprises at least one of: a reference signal time difference (RSTD); a reference signal received power (RSRP); a reference signal received power per path (RSRPP); a timing measurement associated with a path; a channel impulse response (CIR) timing measurement; a CIR power measurement; a CIR phase measurement; a channel frequency response (CFR) frequency measurement; a CFR power measurement; or a CFR phase measurement.

Aspect 6 is the method of any of aspects 1 to 5, further comprising: receiving a second conditional configuration to obtain a set of labels; obtaining the set of labels based on at least one second condition of the second conditional configuration; and outputting the set of labels to at least one of train or verify the positioning model based on the second conditional configuration.

Aspect 7 is the method of aspect 6, wherein the second configuration comprises a second set of conditions, wherein the second set of conditions comprises at least one of: a first threshold range associated with a second subset of the measured set of positioning signals used to calculate a location of the UE; a second threshold range associated with a label error rate associated with a calculation method used to calculate the location of the UE; a first indicator of a set of calculation methods used to calculate the location of the UE; a second indicator of a statistical representation method used to summarize a set of calculated locations of the UE; or a third indicator of a set of label quality standards associated with the set of labels.

Aspect 8 is the method of either of aspects 6 or 7, wherein outputting the set of labels comprises at least one of: training the positioning model at the UE based on the set of labels; or verifying the positioning model at the UE based on the set of labels.

Aspect 9 is the method of any of aspects 6 to 8, wherein outputting the set of labels comprises transmitting the set of labels to a network entity to at least one of train or verify the positioning model.

Aspect 10 is the method of any of aspects 6 to 9, wherein obtaining the set of labels comprises at least one of: receiving a first subset of the set of labels; or calculating a second subset of the set of labels.

Aspect 11 is the method of any of aspects 1 to 10, further comprising transmitting a request for the conditional configuration before the reception of the conditional configuration.

Aspect 12 is the method of aspect 11, wherein the request comprises an indicator of a threshold range, further comprising selecting the subset of the measured set of positioning signals based on the threshold range.

Aspect 13 is the method of either of aspects 11 or 12, wherein the request comprises at least one of a first indicator of a threshold range associated with a calculation of a set of labels or a second indicator of a label calculation condition associated with the calculation of the set of labels, further comprising obtaining the set of labels based on the request; and outputting the set of labels to at least one of train or verify the positioning model.

Aspect 14 is the method of aspect 13, wherein obtaining the set of labels based on the request comprises at least one of: receiving a first subset of the set of labels; or calculating a second subset of the set of labels.

Aspect 15 is the method of either of aspects 13 or 14, wherein the request comprises at least one of: a second threshold range associated with a set of measured positioning signals used to calculate a location of the UE; a third threshold range associated with a label error rate associated with a calculation method used to calculate the location of the UE; a third indicator of a set of calculation methods used to calculate the location of the UE; a fourth indicator of a statistical representation method used to summarize a set of calculated locations of the UE; or a fifth indicator of a set of label quality standards associated with the set of labels.

Aspect 16 is the method of any of aspects 1 to 15, wherein outputting the subset of the measured set of positioning signals comprises: training the positioning model at the UE based on the subset of the measured set of positioning signals; or verifying the positioning model at the UE based on the subset of the measured set of positioning signals.

Aspect 17 is the method of any of aspects 1 to 16, wherein outputting the subset of the measured set of positioning signals comprises transmitting the subset of the measured set of positioning signals to a network entity to at least one of train or verify the positioning model.

Aspect 18 is the method of any of aspects 1 to 17, wherein the UE comprises a positioning reference unit (PRU) having a known location; further comprising outputting the known location as a label to at least one of train or verify the positioning model.

Aspect 19 is a method of wireless communication at a network entity, comprising: configuring a conditional configuration for a selection of a subset of measurements of a set of positioning signals to at least one of train or verify a positioning model; and transmitting the conditional configuration to at least one of train or verify the positioning model.

Aspect 20 is the method of aspect 19, wherein the conditional configuration comprises an indicator of a set of conditions, wherein the set of conditions comprises a threshold range for the selection of the subset of measurements of the set of positioning signals, wherein the subset of measurements of the set of positioning signals are within the threshold range.

Aspect 21 is the method of aspect 20, wherein the threshold range comprises at least one of: a reference signal received power (RSRP) threshold range; a signal to noise ratio (SNR) threshold range; a signal to interference and noise ratio (SINR) threshold range; a delay spread threshold range; a Rician factor threshold range; a Doppler spread threshold range; or a multipath component threshold range.

Aspect 22 is the method of any of aspects 19 to 21, wherein the conditional configuration comprises an indicator of a set of conditions, wherein the set of conditions comprises a measurement type, wherein the subset of measurements of the set of positioning signals comprise the measurement type.

Aspect 23 is the method of aspect 22, wherein the measurement type comprises at least one of: a reference signal time difference (RSTD); a reference signal received power (RSRP); a reference signal received power per path (RSRPP); a timing measurement associated with a path; a channel impulse response (CIR) timing measurement; a CIR power measurement; a CIR phase measurement; a channel frequency response (CFR) frequency measurement; a CFR power measurement; or a CFR phase measurement.

Aspect 24 is the method of any of aspects 19 to 23, further comprising: configuring a second conditional configuration to obtain a set of labels to at least one of train or verify the positioning model; and transmitting the second conditional configuration to obtain the set of labels to at least one of train or verify the positioning model.

Aspect 25 is the method of aspect 24, wherein the second conditional configuration comprises a set of conditions, wherein the set of conditions comprise at least one of: a first threshold range for a second selection of a second subset of the measurements of the set of positioning signals for a calculation of a location of a user equipment (UE); a second threshold range for a label error rate associated with the calculation of the location of the UE; a first indicator of a set of calculation methods for the calculation of the location of the UE; a second indicator of a statistical representation method for the calculation of the location of the UE; or a third indicator of a set of label quality standards for the calculation of the location of the UE.

Aspect 26 is the method of either of aspects 24 or 25, further comprising: receiving a subset of the set of labels; and training the positioning model at the network entity based on the set of labels or verifying the positioning model at the network entity based on the set of labels.

Aspect 27 is the method of any of aspects 24 to 26, further comprising: receiving a set of measurements of a second set of positioning signals; calculating a subset of the set of labels based on the set of measurements; and transmitting the subset of the set of labels based on the second conditional configuration.

Aspect 28 is the method of any of aspects 19 to 27, further comprising: receiving a request for the conditional configuration, wherein the transmission of the conditional configuration is based on the request.

Aspect 29 is the method of aspect 28, wherein the request comprises an indicator of a threshold range, wherein configuring the conditional configuration for the selection of the subset of measurements of the set of positioning signals to at least one of train or verify the positioning model comprises configuring the conditional configuration based on the threshold range.

Aspect 30 is the method of either of aspects 28 or 29, wherein the request comprises at least one of a first indicator of a threshold range associated with a calculation of a set of labels or a second indicator of a label calculation condition associated with the calculation of the set of labels, further comprising: configuring a second conditional configuration to obtain the set of labels based on at least one of the threshold range or the label calculation condition; and transmitting the second conditional configuration to obtain the set of labels to at least one of train or verify the positioning model.

Aspect 31 is the method of aspect 30, further comprising: receiving a subset of the set of labels; and training the positioning model at the network entity based on the set of labels or verifying the positioning model at the network entity based on the set of labels.

Aspect 32 is the method of either of aspects 30 or 31, further comprising: receiving a set of measurements of a second set of positioning signals; calculating a subset of the set of labels based on the set of measurements; and transmitting the subset of the set of labels based on the second conditional configuration.

Aspect 33 is the method of any of aspects 28 to 32, wherein the request comprises at least one of: a first threshold range for a second selection of a second subset of the measurements of the set of positioning signals for a calculation of a location of a user equipment (UE); a second threshold range for a label error rate associated with the calculation of the location of the UE; a first indicator of a set of calculation methods for the calculation of the location of the UE; a second indicator of a statistical representation method for the calculation of the location of the UE; or a third indicator of a set of label quality standards for the calculation of the location of the UE.

Aspect 34 is the method of any of aspects 19 to 33, further comprising: receiving the subset of measurements of the set of positioning signals; and training the positioning model at the network entity based on the subset of measurements of the set of positioning signals or verifying the positioning model at the network entity based on the subset of measurements of the set of positioning signals.

Aspect 35 is the method of any of aspects 19 to 34, wherein the network entity comprises a location management function (LMF).

Aspect 36 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 35.

Aspect 37 is an apparatus for wireless communication, comprising means for performing each step in the method of any of aspects 1 to 35.

Aspect 38 is the apparatus of any of aspects 36 to 37, further comprising a transceiver (e.g., a transceiver coupled to the at least one processor in Aspect 36) configured to receive or to transmit in association with the method of any of aspects 1 to 35.

Aspect 39 is a computer-readable medium (e.g., a non-transitory computer-readable medium) storing computer executable code, the code when executed by at least one processor causes the at least one processor to perform the method of any of aspects 1 to 35.

What is claimed is:

1. An apparatus for wireless communication at a user equipment (UE), comprising:
    at least one memory; and
    at least one processor coupled to the at least one memory and, based at least in part on information stored in the at least one memory, the at least one processor is configured to:
        receive a conditional configuration for collecting measurements to at least one of train or verify a positioning model;
        receive a set of positioning signals;
        measure the set of positioning signals;
        output a subset of the measured set of positioning signals to at least one of train or verify the positioning model based on at least one condition of the conditional configuration;
        receive a second conditional configuration to obtain a set of labels;
        obtain the set of labels based on at least one second condition of the second conditional configuration; and
        output the set of labels to at least one of train or verify the positioning model based on the second conditional configuration.

2. The apparatus of claim 1, wherein the conditional configuration comprises an indicator of a set of conditions, wherein the set of conditions comprises a threshold range, wherein the at least one processor is further configured to:
    select the subset of the measured set of positioning signals based on the threshold range.

3. The apparatus of claim 2, wherein the threshold range comprises at least one of:
    a reference signal received power (RSRP) threshold range;
    a signal to noise ratio (SNR) threshold range;
    a signal to interference and noise ratio (SINR) threshold range;
    a delay spread threshold range;
    a Rician factor threshold range;
    a Doppler spread threshold range; or
    a multipath component threshold range.

4. The apparatus of claim 1, wherein the conditional configuration comprises an indicator of a set of conditions, wherein the set of conditions comprises a measurement type, wherein, to measure the set of positioning signals, the at least one processor is configured to:
    measure the set of positioning signals based on the measurement type.

5. The apparatus of claim 4, wherein the measurement type comprises at least one of:
    a reference signal time difference (RSTD);
    a reference signal received power (RSRP);
    a reference signal received power per path (RSRPP);
    a timing measurement associated with a path;
    a channel impulse response (CIR) timing measurement;
    a CIR power measurement;
    a CIR phase measurement;
    a channel frequency response (CFR) frequency measurement;
    a CFR power measurement; or
    a CFR phase measurement.

49

50

6. The apparatus of claim 1, wherein the second conditional configuration comprises a second set of conditions, wherein the second set of conditions comprises at least one of:

a first threshold range associated with a second subset of the measured set of positioning signals used to calculate a location of the UE;

a second threshold range associated with a label error rate associated with a calculation method used to calculate the location of the UE;

a first indicator of a set of calculation methods used to calculate the location of the UE;

a second indicator of a statistical representation method used to summarize a set of calculated locations of the UE; or a third indicator of a set of label quality standards associated with the set of labels.

7. The apparatus of claim 1, wherein, to output the set of labels, the at least one processor, is configured to:

train the positioning model at the UE based on the set of labels; or verify the positioning model at the UE based on the set of labels.

8. The apparatus of claim 1, wherein, to output the set of labels, the at least one processor is configured to:

transmit the set of labels to a network entity to at least one of train or verify the positioning model.

9. The apparatus of claim 1, wherein, to obtain the set of labels, the at least one processor is configured to:

receive a first subset of the set of labels; or calculate a second subset of the set of labels.

10. The apparatus of claim 1, wherein the at least one processor is further configured to:

transmit a request for the conditional configuration before the reception of the conditional configuration.

11. The apparatus of claim 10, wherein the request comprises an indicator of a threshold range, wherein the at least one processor is further configured to:

select the subset of the measured set of positioning signals based on the threshold range.

12. An apparatus for wireless communication at a user equipment (UE), comprising:

at least one memory; and at least one processor coupled to the at least one memory and, based at least in part on information stored in the at least one memory, the at least one processor is configured to:

transmit a request for a conditional configuration, wherein the request comprises at least one of a first indicator of a threshold range associated with a calculation of a set of labels or a second indicator of a label calculation condition associated with the calculation of the set of labels;

receive the conditional configuration for collecting measurements to at least one of train or verify a positioning model;

receive a set of positioning signals;

measure the set of positioning signals;

output a subset of the measured set of positioning signals to at least one of train or verify the positioning model based on at least one condition of the conditional configuration;

obtain the set of labels based on the request; and output the set of labels to at least one of train or verify the positioning model.

13. The apparatus of claim 12, wherein, to obtain the set of labels based on the request, the at least one processor is configured to:

receive a first subset of the set of labels; or calculate a second subset of the set of labels.

14. The apparatus of claim 12, wherein the request comprises at least one of:

a second threshold range associated with a set of measured positioning signals used to calculate a location of the UE;

a third threshold range associated with a label error rate associated with a calculation method used to calculate the location of the UE;

a third indicator of a set of calculation methods used to calculate the location of the UE;

a fourth indicator of a statistical representation method used to summarize a set of calculated locations of the UE; or a fifth indicator of a set of label quality standards associated with the set of labels.

15. The apparatus of claim 1, wherein, to output the subset of the measured set of positioning signals, the at least one processor is configured to:

train the positioning model at the UE based on the subset of the measured set of positioning signals; or verify the positioning model at the UE based on the subset of the measured set of positioning signals.

16. The apparatus of claim 1, further comprising a transceiver coupled to the at least one processor, wherein, to output the subset of the measured set of positioning signals, the at least one processor is configured to:

transmit, via the transceiver, the subset of the measured set of positioning signals to a network entity to at least one of train or verify the positioning model.

17. The apparatus of claim 1, wherein the UE comprises a positioning reference unit (PRU) having a known location, wherein the at least one processor is further configured to:

output the known location as a label to at least one of train or verify the positioning model.

18. An apparatus for wireless communication at a network entity, comprising:

at least one memory; and at least one processor coupled to the at least one memory and, based at least in part on information stored in the at least one memory, the at least one processor is configured to:

configure a conditional configuration for a selection of a subset of measurements of a set of positioning signals to at least one of train or verify a positioning model;

transmit the conditional configuration to at least one of train or verify the positioning model;

configure a second conditional configuration to obtain a set of labels to at least one of train or verify the positioning model; and transmit the second conditional configuration to obtain the set of labels to at least one of train or verify the positioning model.

19. The apparatus of claim 18, wherein the conditional configuration comprises an indicator of a set of conditions, wherein the set of conditions comprises a threshold range for the selection of the subset of measurements of the set of positioning signals, wherein the subset of measurements of the set of positioning signals are within the threshold range.

20. The apparatus of claim 18, wherein the conditional configuration comprises an indicator of a set of conditions, wherein the set of conditions comprises a measurement type, wherein the subset of measurements of the set of positioning signals comprise the measurement type.

21. The apparatus of claim 18, wherein the second conditional configuration comprises a set of conditions, wherein the set of conditions comprise at least one of:

a first threshold range for a second selection of a second subset of the measurements of the set of positioning signals for a calculation of a location of a user equipment (UE);

a second threshold range for a label error rate associated with the calculation of the location of the UE;

a first indicator of a set of calculation methods for the calculation of the location of the UE;

a second indicator of a statistical representation method for the calculation of the location of the UE; or a third indicator of a set of label quality standards for the calculation of the location of the UE.

22. The apparatus of claim 18, wherein the at least one processor is further configured to:

receive a set of measurements of a second set of positioning signals;

calculate a subset of the set of labels based on the set of measurements; and transmit the subset of the set of labels based on at least one second condition of the second conditional configuration.

23. The apparatus of claim 18, wherein the at least one processor is further configured to:

receive a request for the conditional configuration, wherein the transmission of the conditional configuration is based on the request.

24. The apparatus of claim 23, wherein the request comprises an indicator of a threshold range, wherein, to configure the conditional configuration for the selection of the subset of measurements of the set of positioning signals to at least one of train or verify the positioning model, the at least one processor, individually or in any combination, is configured to:

configure the conditional configuration based on the threshold range.

25. The apparatus of claim 23, further comprising a transceiver coupled to the at least one processor, wherein the request comprises at least one of a first indicator of a threshold range associated with a calculation of the set of labels or a second indicator of a label calculation condition associated with the calculation of the set of labels, wherein the at least one processor is further configured to:

configure a third conditional configuration to obtain the set of labels based on at least one of the threshold range or the label calculation condition; and transmit, via the transceiver, the third conditional configuration to obtain the set of labels to at least one of train or verify the positioning model.

26. The apparatus of claim 23, wherein the request comprises at least one of:

a first threshold range for a second selection of a second subset of the measurements of the set of positioning signals for a calculation of a location of a user equipment (UE);

a second threshold range for a label error rate associated with the calculation of the location of the UE;

a first indicator of a set of calculation methods for the calculation of the location of the UE;

a second indicator of a statistical representation method for the calculation of the location of the UE; or a third indicator of a set of label quality standards for the calculation of the location of the UE.

27. A method of wireless communication at a user equipment (UE), comprising:

receiving a conditional configuration for collecting measurements to at least one of train or verify a positioning model;

receiving a set of positioning signals;

measuring the set of positioning signals;

outputting a subset of the measured set of positioning signals to at least one of train or verify the positioning model based on at least one condition of the conditional configuration;

receiving a second conditional configuration to obtain a set of labels;

obtaining the set of labels based on at least one second condition of the second conditional configuration; and outputting the set of labels to at least one of train or verify the positioning model based on the second conditional configuration.

\* \* \* \* \*